(12) United States Patent  (10) Patent No.: US 9,001,152 B2
Ihara et al.  (45) Date of Patent: Apr. 7, 2015

(54) INFORMATION PROCESSING APPARATUS, INFORMATION PROCESSING METHOD, AND PROGRAM

(75) Inventors: Noboru Ihara, Tokyo (JP); Kazuhiro Sasao, Tokyo (JP); Masaru Yokoyama, Tokyo (JP); Arata Sakurai, Tokyo (JP); Ricardo Musashi Okamoto, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 48 days.

(21) Appl. No.: 13/543,234

(22) Filed: Jul. 6, 2012

(65) Prior Publication Data

US 2012/0320088 A1  Dec. 20, 2012

Related U.S. Application Data

(63) Continuation of application No. 13/542,937, filed on Jul. 6, 2012, which is a continuation of application No. PCT/JP2011/057769, filed on Mar. 29, 2011.

(30) Foreign Application Priority Data

Mar. 30, 2010  (JP) ................................ 2010-079219
Jun. 17, 2010  (JP) ................................ 2010-138517
Mar. 18, 2011  (JP) ................................ 2011-061339
Mar. 24, 2011  (JP) ................................ 2011-066594

(51) Int. Cl.
G09G 5/00  (2006.01)
G06F 3/0481  (2013.01)
G05B 23/02  (2006.01)
G06F 3/01  (2006.01)
G06T 19/00  (2011.01)

(Continued)

(52) U.S. Cl.
CPC .......... *G05B 23/0216* (2013.01); *G06F 3/0481* (2013.01); *G05B 2219/32014* (2013.01); *G06F 3/011* (2013.01); *G06T 19/006* (2013.01)

(58) Field of Classification Search
CPC ......... G06T 19/006; G09G 5/08; G09G 5/006
USPC .................................................. 345/629–634
See application file for complete search history.

(56) References Cited

U.S. PATENT DOCUMENTS 8,234,095 B2  7/2012  Nagafuchi et al.
2002/0010571 A1  1/2002  Daniel, Jr. et al.
(Continued)

FOREIGN PATENT DOCUMENTS

EP  0 258 553 A2  3/1988
JP  2001-013009 A  1/2001
(Continued)

OTHER PUBLICATIONS

International Preliminary Report on Patentability dated Nov. 13, 2012, 11 pages.
(Continued)

*Primary Examiner* — Ke Xiao
*Assistant Examiner* — Kim-Thanh T Tran
(74) *Attorney, Agent, or Firm* — Arent Fox LLP

(57) ABSTRACT

An information processing apparatus including an imaged image input unit inputting an imaged image of a facility imaged in an imaging device to a display control unit, a measurement information input unit inputting measurement information measured by a sensor provided in the facility from the sensor to a creation unit, a creation unit creating a virtual image representing a status of an outside or inside of the facility based on the measurement information input by the measurement information input unit, and a display control unit overlaying and displaying the virtual image created in the creation unit and the imaged image input by the imaged image input unit on a display device.

17 Claims, 44 Drawing Sheets

(56) References Cited

U.S. PATENT DOCUMENTS

| | | |
|---|---|---|
| 2002/0075244 A1 | 6/2002 | Tani et al. |
| 2002/0191004 A1 | 12/2002 | Ebersole et al. |
| 2003/0210228 A1* | 11/2003 | Ebersole et al. ............. 345/157 |
| 2007/0002078 A1* | 1/2007 | He et al. ........................ 345/633 |
| 2007/0273610 A1 | 11/2007 | Baillot |
| 2008/0009965 A1* | 1/2008 | Bruemmer et al. ........... 700/245 |
| 2008/0248450 A1 | 10/2008 | Li et al. |
| 2011/0020776 A1 | 1/2011 | Nielsen et al. |
| 2011/0027761 A1 | 2/2011 | Nunez et al. |
| 2011/0066262 A1* | 3/2011 | Kelly et al. .................... 700/90 |
| 2011/0311127 A1 | 12/2011 | Mizutani et al. |

FOREIGN PATENT DOCUMENTS

| | | |
|---|---|---|
| JP | 2001-134357 A | 5/2001 |
| JP | 2002-007703 A | 1/2002 |
| JP | 2003-006219 A | 1/2003 |
| JP | 2004-102835 A | 4/2004 |
| JP | 2008-026185 A | 2/2008 |
| JP | 2009-538487 A | 11/2009 |
| WO | WO 00/52541 A1 | 9/2000 |
| WO | WO 2007/139676 A2 | 12/2007 |
| WO | WO 2011/080882 A1 | 7/2011 |

OTHER PUBLICATIONS

Notification of Reasons for Refusal, dated Dec. 6, 2011, 4 pages.
European Search Report dated Jan. 8, 2013, 7 pages.
European Search Report dated Apr. 7, 2014 corresponding to European Patent Application No. 12175201.8.
Holejko, K. et al. "Application of augmented reality to the industrial systems for signalisation of emergency situations". Proc. of SPIE, vol. 6159, 2006., Bellingham, WA.

* cited by examiner

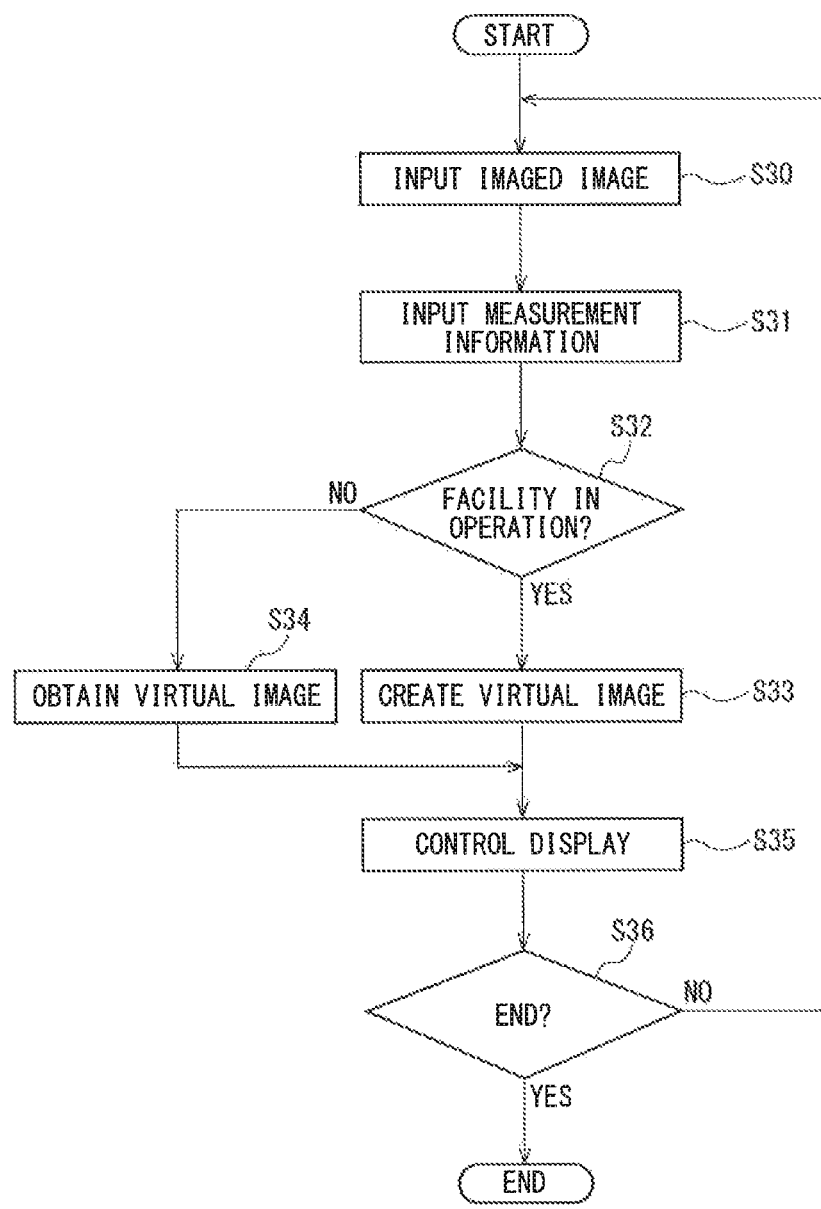

FIG.21

| MARKER ID | FACILITY ID |
|---|---|
| MARKER A | TORPEDO CAR A |
| MARKER B | TORPEDO CAR B |

FIG.22

| FACILITY ID | ORDER ID |
|---|---|
| TORPEDO CAR A | ABC123 |
| TORPEDO CAR A | EDF456 |
| TORPEDO CAR B | G123 |
| TORPEDO CAR B | X456 |

FIG.30

| DANGEROUS OBJECT ID | DANGEROUS OBJECT NAME | TYPE OF DANGER | REFERENCE POSITION (LATITUDE, LONGITUDE) | STATE | DANGEROUS RANGE OF EACH STATE | CURRENT STATUS |
|---|---|---|---|---|---|---|
| 001 | CRANE | ·FALL OF SUSPENDED OBJECT<br>·CONTACT OF CRANE ARM | 35.354417, 139.867623 | FULLY OPERATING | 15 m DIAMETER<br>20 m HEIGHT | |
| | | | | ONLY EAST SIDE IS OPERATING | 15 m DIAMETER<br>20 m HEIGHT<br>0°~180° | ○ |
| 002 | GAS PIPE | ·TOXIC GAS LEAKAGE (WITH SMALLER SPECIFIC GRAVITY THAN AIR) | STRAIGHT SECTION FROM 35.362012, 139.863589 TO 35.360787, 139.867451 | 9:00~17:00 | 5 m HORIZONTALLY FROM GAS PIPE<br>∞ ON VERTICALLY UPPER SIDE | ○ |
| 003 | LATHE | ·FLYING MATTER | 35.355467, 139.883459 | WHEN OPERATING | 5 m DIAMETER | |
| ... | ... | ... | ... | ... | ... | ... |
| ... | ... | ... | ... | ... | ... | ... |

| DANGEROUS OBJECT ID | DANGEROUS OBJECT NAME | TYPE OF DANGER | POSITIONING REFERENCE | STATE | DANGEROUS RANGE OF EACH STATE | CURRENT STATUS | CURRENT POSITION (LATITUDE, LONGITUDE) |
|---|---|---|---|---|---|---|---|
| 010 | AGV | ·CONTACT IN MOVING ROUTE | MARKER : M010 | MOVING | 2 m DIAMETER FROM MARKER | | 35.355187, 139.874018 |
| | | | | STOPPED | — | ○ | |
| 011 | CRANE TRUCK | ·FALL OF SUSPENDED OBJECT ·CONTACT OF CRANE ARM | FOUR CORNERS OF VEHICLE BODY | MOVING | 2 m FROM VEHICLE BODY | | 35.360752, 139.877622 |
| | | | ARM FULCRUM | ARM OPERATING | 10 m FROM ARM FULCRUM 7 m FROM GROUND SURFACE | ○ | |
| ○○○ | ○○○ | ○○○ | ○○○ | ○○○ | ○○○ | ○×○ | ○○○ |
| ○○○ | ○○○ | ○○○ | ○○○ | ○○○ | ○○○ | ○○○ | ○○○ |

| DANGEROUS OBJECT ID | DANGEROUS OBJECT NAME | TYPE OF DANGER | REFERENCE POSITION (LATITUDE, LONGITUDE) | STATE | DANGEROUS RANGE OF EACH STATE | CURRENT STATUS | DISPLAY CONDITION |
|---|---|---|---|---|---|---|---|
| 001 | CRANE | ·FALL OF SUSPENDED OBJECT<br>·CONTACT OF CRANE ARM | 35.354417, 139.867623 | FULLY OPERATING | 15 m DIAMETER 20 m HEIGHT | | WITHIN 30 m |
| | | | | ONLY EAST SIDE IS OPERATING | 15 m DIAMETER 20 m HEIGHT 0°~180° | ○ | WITHIN 30 m |
| 002 | GAS PIPE | ·TOXIC GAS LEAKAGE (WITH SMALLER SPECIFIC GRAVITY THAN AIR) | STRAIGHT SECTION FROM 35.362012, 139.863589 TO 35.360707, 139.867451 | 9:00~17:00 | 5 m HORIZONTALLY FROM GAS PIPE ∞ ON VERTICALLY UPPER SIDE | ○ | WITHIN 50 m |
| 003 | LATHE | ·FLYING MATTER | 35.355467, 139.833459 | WHEN OPERATING | 5 m DIAMETER | | WITHIN 10 m |
| ... | ... | ... | ... | ... | ... | ... | ... |
| ... | ... | ... | ... | ... | ... | ... | ... |

910

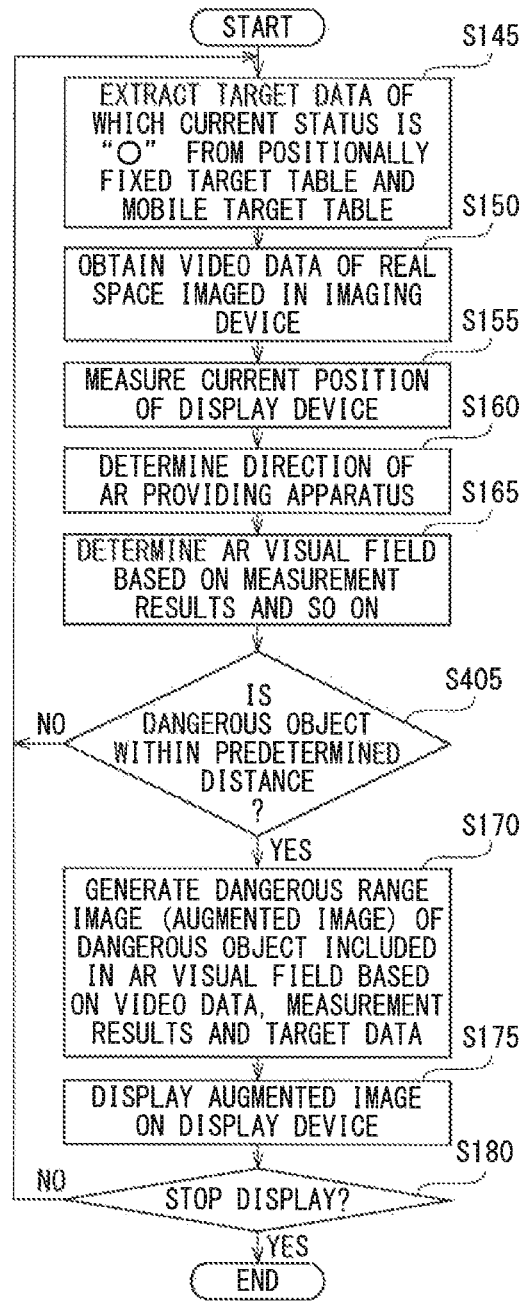

INFORMATION PROCESSING APPARATUS, INFORMATION PROCESSING METHOD, AND PROGRAM

CROSS-REFERENCE TO RELATED APPLICATIONS

This application is a Continuation of U.S. application Ser. No. 13/542,937, titled "Information Processing Apparatus, Information Processing Method, and Program, filed on Jul. 6, 2012, which is a Continuation of International Application No. PCT/JP2011/057769, with an international filing date of Mar. 29, 2011, which designates the United States of America, which claims priority to Japanese Application No. 2010-079219, filed on Mar. 30, 2010, Japanese Application No. 2010-138517, filed on Jun. 17, 2010, Japanese Application No. 2011-061339, filed on Mar. 18, 2011, and Japanese Application No. 2011-066594, filed on Mar. 24, 2011, the entire contents of each of which are incorporated herein by reference in their entirety.

TECHNICAL FIELD

The present invention relates to an information processing apparatus, an information processing method, and a program.

BACKGROUND ART

Conventionally, in an observation trip regarding an installation for a factory, or the like, observers observe an actual installation or facility, or observe a prepared panel or video. On the other hand, for example, Patent Document 1 proposes a system to overlay-display element information corresponding to the site on an actual site image imaged by a portable terminal or the like, according to the movement of an observer.

In dangerous worksite areas, e.g., at a factory or a construction site, the dangerous area is indicated with a visual warning such as paint, a sign or other posted warning. Since indications of these dangerous spots (dangerous spot indications) are stationery, in general, indications and signs are posted throughout the range where there may be a danger.

There may be cases where a dangerous area is always dangerous, and there may be cases where it is dangerous only during a particular period of time. For example, crane operation site in a factory, the area below a hanging load becomes a dangerous spot only when the crane is in operation.

CITATION LIST

Patent Literature

Patent Literature 1: Japanese Laid-open Patent Publication No. 2004-102835
Patent Literature 2: Japanese Laid-open Patent Publication No. 2002-7703

SUMMARY

Technical Problem

Depending on the installation or factory, there may be cases where there is a danger and an observer cannot get close to a facility. Further, even when it is possible to get close, there may be cases where the inside of the facility cannot be seen.

For example, when the technology of Patent Document 1 is applied to an observation trip in an installation or a factory, it is merely to the extent to see the name of a facility or the like as a virtual image, and there has been a problem that the observer does not feel the reality of the observed installation or factory.

Further, in a factory, there may be cases where the operational status of a facility is predicted by simulation, but the simulation results are just displayed in a two-dimensional cross-sectional view on a screen of a computer terminal. Accordingly, there has been a problem that it is not easy for the operator to comprehend the simulation results.

Aspects presented herein are made in view of such problems, and a first object thereof is to communicate the operational status of a facility, or the like, or simulation results with reality to an observer or worker in an installation or a factory.

Regarding a conventional dangerous spot indication for a stationery crane arm or the like, for example, the entire movable range of the crane arm is assumed to be a dangerous spot, and a dangerous spot indication (such as hatching or the like) is provided on the ground. Thus, in the conventional dangerous spot indication, there is a problem that a dangerous spot is indicated as being larger than necessary, making it difficult to determine the actual range of the dangerous spot. Further, the conventional dangerous spot indication also has a problem that dust, oil, or the like may soil the indication, making the indication itself unseeable, or maintenance such as cleaning or repainting is required when it is soiled.

On the other hand, regarding a conventional dangerous spot indication for a mobile crane truck or the like, since the location where the crane is used is not stationery, an indication "KEEP CLEAR OF 10 M RADIUS" or the like is posted on the crane truck. However, there is a problem that the dangerous spot cannot be visually recognized, and the dangerous spot becomes obscure. Further, there are also cases to physically hinder entrance with pylons or the like, but there is a problem that it takes labor to prepare them.

Aspects presented herein are made in view of such problems, and a second object thereof is to indicate a dangerous spot more appropriately when the dangerous spot changes temporally.

Solution to Problem

Accordingly, an information processing apparatus, according to aspects presented herein, has: an imaged image input unit inputting an imaged image of a facility imaged in an imaging device to a display control unit; a measurement information input unit inputting measurement information measured by a sensor provided in the facility from the sensor to a creation unit; a creation unit creating a virtual image representing a status of an outside or inside of the facility based on the measurement information input by the measurement information input unit; and a display control unit overlaying and displaying the virtual image created in the creation unit and the imaged image input by the imaged image input unit on a display device.

With such a structure, the operating status of a facility, or the like, can be communicated in a realistic manner to an observer in an installation or a factory.

Note that the information processing apparatus corresponds to, for example, an AR server which will be described later.

Further, an information processing apparatus, according to aspects presented herein, has: a measurement information input unit inputting measurement information measured by a sensor provided in the facility from the sensor to a creation unit; a creation unit creating a virtual image representing a status of an outside or inside of the facility based on the measurement information input by the measurement information input unit; and a display control unit overlaying and displaying the virtual image created in the creation unit on the facility which is seen through a display device.

With such a structure, the operating status of a facility or the like can be communicated in a realistic manner to an observer in an installation or a factory.

Note that the information processing apparatus corresponds to, for example, an AR server which will be described later.

Further, an information providing apparatus, according to aspects presented herein, comprises an information providing apparatus having a display unit and connected communicably to a storage unit, the information providing apparatus having: a reading unit reading dangerous range information indicating a dangerous range of each state of a dangerous target and dangerous target position information indicating a position of the dangerous target, which are stored in the storage unit; a position information obtaining unit obtaining apparatus position information calculated from information indicating a position of the information providing apparatus which is detected in a position detection device; a direction information obtaining unit obtaining direction information calculated from information indicating a direction of the information providing apparatus which is detected in a direction detection device; a posture information obtaining unit obtaining posture information calculated from information indicating a posture of the information providing apparatus which is detected in a posture detection device; a determination unit determining a visual field of the information providing apparatus based on the apparatus position information obtained in the position information obtaining unit, the direction information obtained in the direction information obtaining unit, the posture information obtained in the posture information obtaining unit, and visual field information of the information providing apparatus which is defined in advance; and a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit.

Here, the "reading unit" corresponds to, for example, a retrieval unit 1055 which will be described later. The "position information obtaining unit" corresponds to, for example, a measurement unit 1040 which will be described later. The "direction information obtaining unit" corresponds to, for example, a direction information obtaining unit 1045 which will be described later. The "posture information obtaining unit" corresponds to, for example, a posture information obtaining unit 1050 which will be described later. The "determination unit" corresponds to, for example, a visual field determination unit 1060 which will be described later. The "display control unit" corresponds to, for example, a display control unit 1065 which will be described later.

Advantageous Effects

According to aspects presented herein, the operating status of a facility or the like can be communicated in a realistic manner to an observer in an installation or a factory.

Further, according to aspects presented herein, a dangerous spot can be indicated more appropriately when the dangerous spot changes temporally.

BRIEF DESCRIPTION OF DRAWINGS

FIG. 12 is a flowchart illustrating an example of display control processing in an AR server of Embodiment 3.

FIG. 21 is a diagram illustrating an example of a facility marker correspondence table.

FIG. 22 is a diagram illustrating an example of a facility usage status table.

FIG. 30 is a diagram illustrating an example of a table storing information related to dangerous objects.

FIG. 31 is a diagram illustrating an example of a table storing information related to dangerous objects.

FIG. 41 is a diagram illustrating an example of a table storing information related to dangerous objects.

FIG. 42 is a diagram illustrating an example of a flowchart related to display processing.

DESCRIPTION OF EMBODIMENTS

Hereinafter, embodiments will be described based on the drawings.

Embodiment 1

Figure 1:
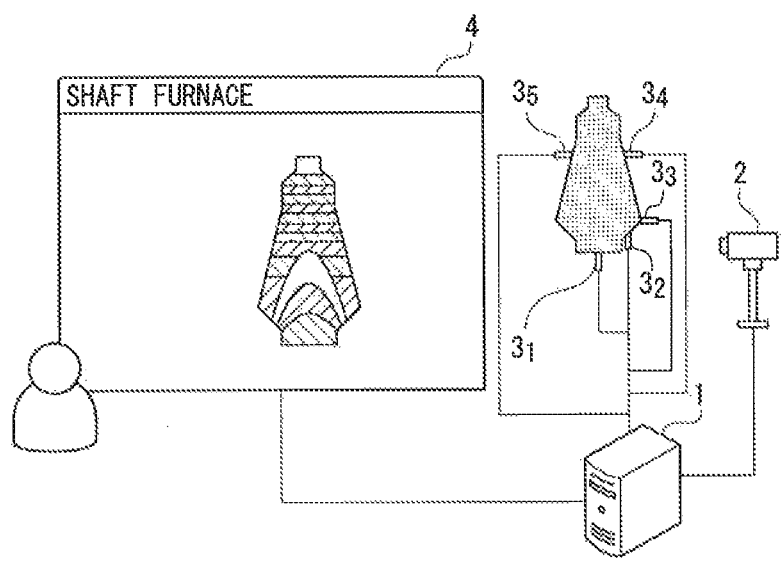
FIG. 1 is a diagram illustrating an example of a system structure of a facility guidance system of Embodiment 1.

FIG. 1 is a diagram illustrating an example of a system structure of a facility guidance system of Embodiment 1. As illustrated in FIG. 1, in the facility guidance system, an AR (Augmented Reality) server 1, a camera 2, sensors $3_1$ to $3_5$, and a display device 4 are connected via a network.

To the AR server 1, an image of a facility in a factory (a shaft furnace in the example of FIG. 1) imaged by the camera 2 is input from the camera 2. Note that in the following embodiments including this embodiment, the description will be given taking examples of facilities in a steel plant as examples of facilities in a factory. Note that this will not limit the following embodiments including this embodiment.

Further, to the AR server 1, measurement information (for example, temperature information of the inside of the shaft furnace, or the like) measured by the sensors $3_1$ to $3_5$ is input from the sensors $3_1$ to $3_5$. Although five sensors are illustrated in FIG. 1, any number of sensors may be used. Note that in this embodiment, although the sensors 3 are provided outside and inside the facility, they may be provided, for example, only inside the facility or only outside the facility depending on the facility. For example, in the case of the shaft furnace, the sensors 3 are provided inside and outside the shaft furnace. In the case of a converter which will be described later, the sensors 3 are provided inside the converter. In the case of a continuous-casting machine which will be described later, the sensors 3 are provided outside the continuous-casting machine. The sensors are not limited to temperature sensors measuring temperature information, and may be, for example, air pressure sensors measuring air pressure information, pressure sensors measuring pressure information, gas sensors measuring the type and concentration of gas, or the like. The sensors $3_1$ to $3_5$ may all be the same type of sensors (for example, temperature sensors or the like), or they may be different types of sensors (for example, a temperature sensor, a gas sensor, a pressure sensor, and so on).

Note that in the following, for brevity of explanation, these plural sensors are simply referred to as sensors unless otherwise noted.

The AR server 1 performs control to create a virtual image representing the status of an outside or inside of the facility based on the input measurement in formation, and overlay and display the created virtual image and the imaged image input from the camera 2 on the display device 4.

An observer of the factory can comprehend with realistic feelings the operating status of a facility located in an area which is dangerous and off-limits, the operational status of the inside of a facility, or the like by observing the display device 4.

Figure 2:
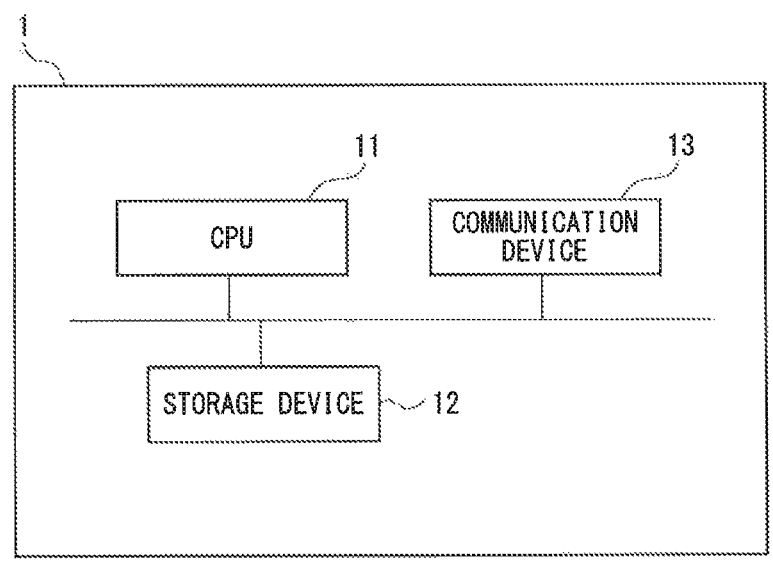
FIG. 2 is a diagram illustrating an example of a hardware structure of an AR server.

FIG. 2 is a diagram illustrating an example of a hardware structure of the AR server 1.

As illustrated in FIG. 2, the AR server 1 includes a CPU 11, a storage device 12, and a communication device 13 as a hardware structure. The CPU 11 executes processing or the like for controlling the AR server 1 based on a program stored in the storage device 12. The storage device 12 stores data and so on used by the program and the CPU 11 when executing processing. The communication device 13 controls communication between the AR server 1 and other devices (for example, the sensors 3, the camera 2, the display device 4, and so on).

By the CPU 11 executing processing based on the program, software structures and processing related to flowcharts which will be described later are achieved.

Figure 3:
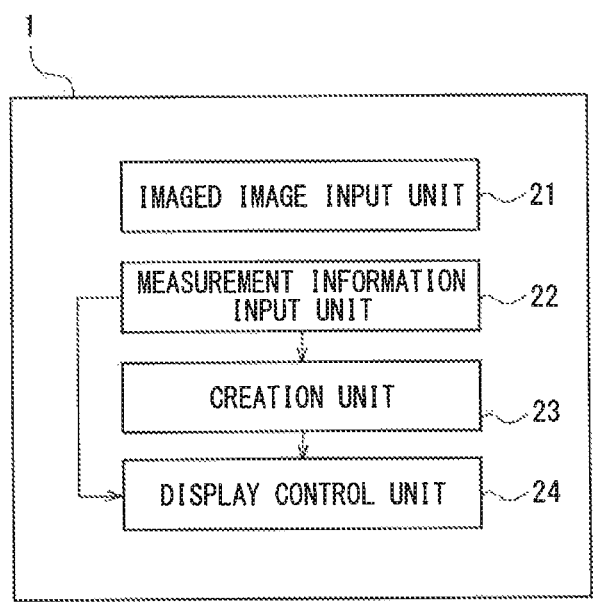
FIG. 3 is a diagram illustrating an example of a software structure of the AR server of Embodiment 1.

FIG. 3 is a diagram illustrating an example of a software structure of the AR server 1 of Embodiment 1.

As illustrated in FIG. 3, the AR server 1 includes an imaged image input unit 21, a measurement information input unit 22, a creation unit 23, and a display control unit 24 as a software structure.

The imaged image input unit 21 receives from the camera 2 an imaged image of the facility in the factory which is imaged by the camera 2 and inputs the imaged image to the display control unit 24.

The measurement information input unit 22 receives from the sensors $3_1$ to $3_5$ measurement information measured by the sensors $3_1$ to $3_5$ and inputs the measurement information to the creation unit 23.

The creation unit 23 creates a virtual image representing the status of the outside or inside of the facility based on the measurement information input by the measurement information input unit 22.

For example, the creation unit 23 receives the measurement information from the measurement information input unit 22, and receives facility information indicating which facility this measurement information is measured from the measurement information input unit 22. The creation unit 23 determines whether or not the facility indicated by the facility information is a facility for which it is set to generate a virtual image of the inside of the facility based on the received facility information. When the facility indicated by the facility information is a facility for which it is set to generate a virtual image of the inside of the facility, the creation unit 23 selects a facility inside estimation model (facility inside estimation mathematical model expression) stored in association with the facility information from the storage device 12 or the like based on the facility information. More specifically, in the storage device 12, for example, a shaft furnace and a shaft furnace inside estimation model may be stored in association. Further, in the storage device 12 or the like, for example, a converter and a converter inside estimation model may be stored in association. When the facility indicated by the facility information indicates a shaft furnace, the creation unit 23 selects the shaft furnace inside estimation model associated with the shaft furnace from the storage device 12 or the like. Then the creation unit 23 substitutes the measurement information input by the measurement information input unit 22 in the selected shaft furnace inside estimation model to estimate the status inside the shaft furnace, and creates a virtual image representing the status inside the shaft furnace.

Note that each estimation model is stored in the storage device 12 merely as a logical model, and is recalculated according to, for example, the measurement information measured by the sensors $3_1$ to $3_5$, to thereby generate a virtual image in a form close to the actual state. Therefore, it is preferred to be a mathematical model expression. However, it may be generated as a computer generated image in advance based on the mathematical model expression, and the display of the image may be changed by changing parameters. More specifically, an adjustment in a height direction is made according to the amount of charged raw material in the shaft furnace, or in an example of a converter which will be described later, it is allowed to change the surface position and so on of molten steel in the furnace based on measurement values of sensors. Alternatively, temperature information measured by the sensors $3_1$ to $3_5$ is applied to the shaft furnace inside estimation model to generate an actual temperature distribution as a virtual image.

Figure 4:
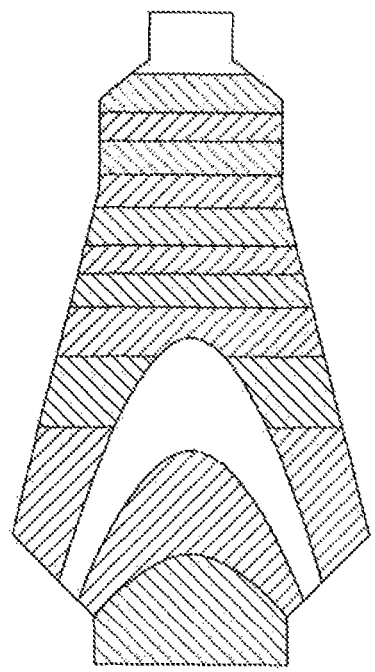
FIG. 4 is a diagram (1) illustrating an example of overlay display of a virtual image and an imaged image of Embodiment 1.
Figure 5:
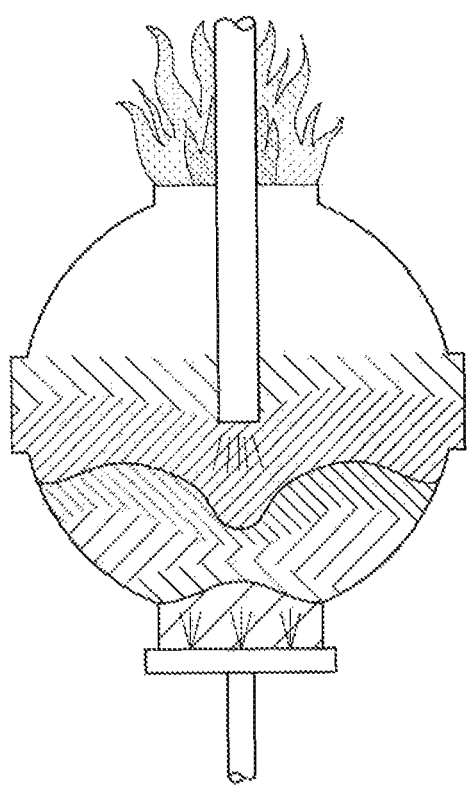
FIG. 5 is a diagram (2) illustrating an example of overlay display of a virtual image and an imaged image of Embodiment 1.
Figure 6:
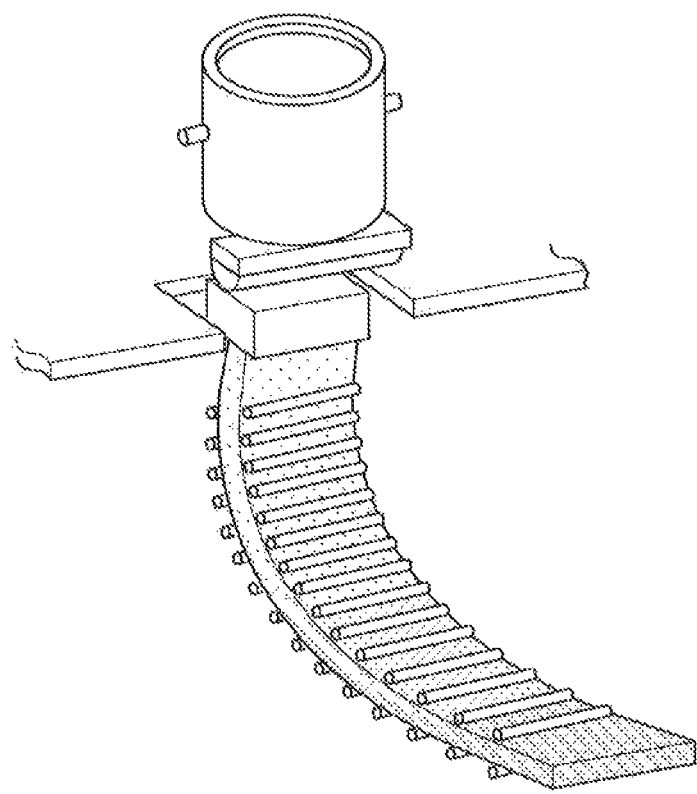
FIG. 6 is a diagram (3) illustrating an example of overlay display of a virtual image and an imaged image of Embodiment 1.

The display control unit 24 performs control to overlay and display on the display device 4 the virtual image representing the status of the outside or inside of the facility created in the creation unit 23 and the imaged image of the facility input by the imaged image input unit 21 (see FIG. 4 to FIG. 6).

FIG. 4 is a diagram (1) illustrating an example of overlay display of a virtual image and an imaged image of Embodiment 1. FIG. 4 illustrates an example of overlaying and displaying an imaged image of a shaft furnace and a virtual image of an inside of the shaft furnace created based on temperature information of the inside of the shaft furnace.

FIG. 5 is a diagram (2) illustrating an example of overlay display of a virtual image and an imaged image of Embodiment 1. FIG. 5 illustrates an example of overlaying and displaying an imaged image of a converter and a virtual image of an inside of the converter created based on temperature information of the inside of the converter.

FIG. 6 is a diagram (3) illustrating an example of overlay display of a virtual image and an imaged image of Embodiment 1. FIG. 6 illustrates an example of overlaying and displaying an imaged image of a continuous-casting machine and steel in a molten state passing through the continuous-casting machine, and a virtual image in which the steel in a molten state passing through the continuous-casting machine is solidifying, which is created based on temperature information of the outside of the continuous-casting machine.

Figure 7:
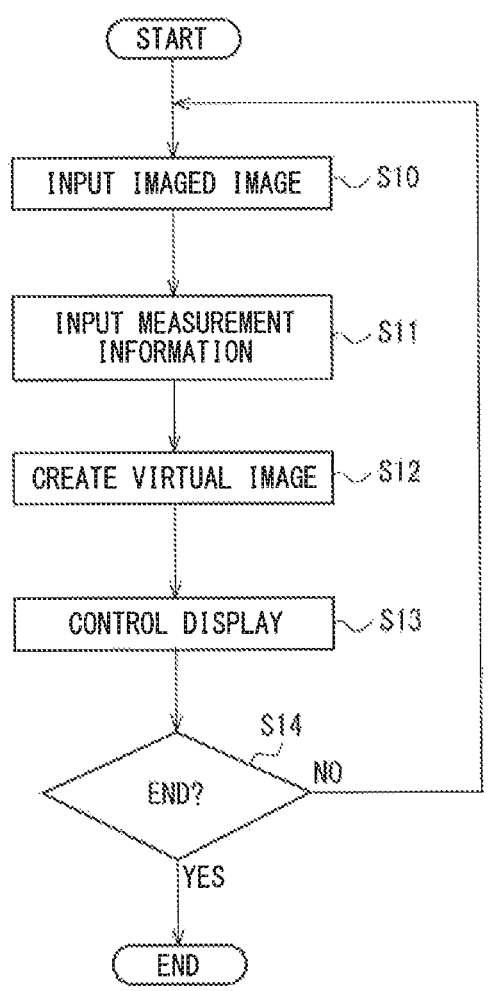
FIG. 7 is a flowchart illustrating an example of display control processing in the AR server of Embodiment 1.

FIG. 7 is a flowchart illustrating an example of display control processing in the AR server 1 of Embodiment 1.

In step S10, the imaged image input unit 21 receives from the camera 2 an imaged image of the facility in the factory which is imaged by the camera 2 and inputs the imaged image to the display control unit 24.

In step S11, the measurement information input unit 22 receives from the sensors $3_1$ to $3_5$ the measurement information measured by the sensors $3_1$ to $3_5$ and inputs the measurement information to the creation unit 23.

In step S12, the creation unit 23 creates a virtual image representing the status of the outside or inside of the facility based on the measurement information input in step S11.

In step S13, the display control unit 24 performs control to overlay and display on the display device 4 the virtual image representing the status of the outside or inside of the facility created in step S12 and the imaged image of the facility input in step S10.

In step S14, for example, the display control unit 24 determines whether to end the processing illustrated in FIG. 7 or not based on whether information of ending display or the like is received or not from the display device 4 or the like. The display control unit 24 ends the processing illustrated in FIG. 7 when it determines to end the processing, or returns the processing to step S10 when it determines not to end the processing.

Note that the imaged image input unit 21 may be configured to constantly receive the imaged image from the camera 2 and input the imaged image to the display control unit 24 as long as imaging is performed by the camera 2. Similarly, the measurement information input unit 22 may be configured to constantly receive the measurement information from the sensors $3_1$ to $3_5$ and input the measurement information to the creation unit 23 as long as measurement is performed by the sensors $3_1$ to $3_5$. The same applies to the following embodiments. In such a structure, the AR server 1 can perform control to create a virtual image based on the measurement information input in real time and overlay and display the virtual image on the imaged image input in real time on the display device 4.

As described above, according to this embodiment, the operating status of a facility or the like can be communicated in a realistic manner to an observer in an installation or a factory. In particular, instead of just showing video images, as has been conventionally performed, it is possible to show the status of a facility which is in an operating state at the present moment, and hence it is possible to provide an observation in a realistic manner, which has not been present.

Embodiment 2

Figure 8:
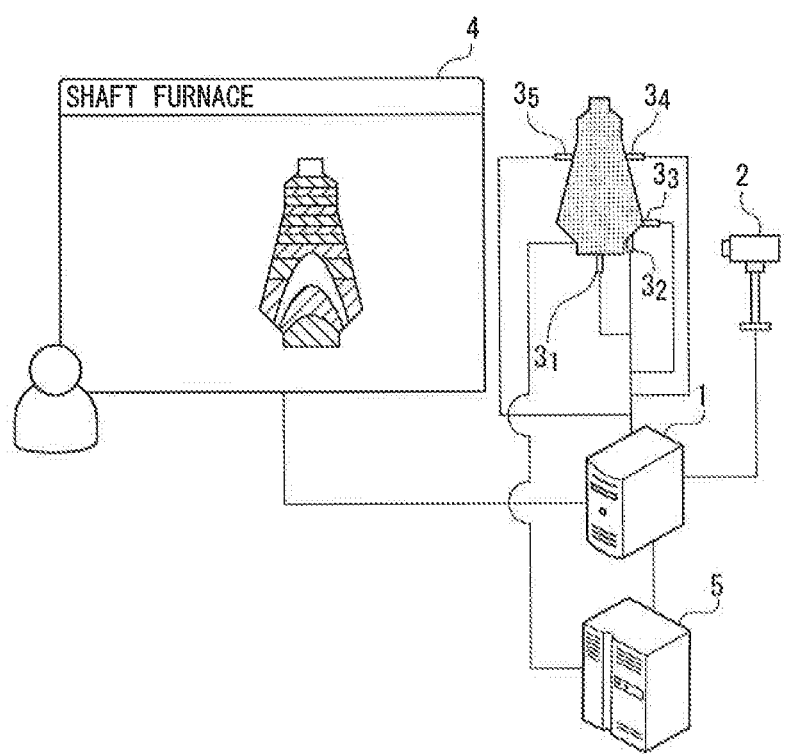
FIG. 8 is a diagram illustrating a system structure of a facility guidance system of Embodiment 2.

FIG. 8 is a diagram illustrating a system structure of a facility guidance system of Embodiment 2. As illustrated in FIG. 8, the system structure of the facility guidance system of Embodiment 2 newly includes an operation server 5 compared to the system structure of the facility guidance system of Embodiment 1.

The operation server 5 transmits control information to a facility inside a factory. The facility executes processing based on the control information. For example, when the facility is a shaft furnace, the operation server 5 transmits to the shaft furnace charging instruction information of sintered ore or the like for instructing charging of sintered ore or the like, cokes charging instruction information for instructing charging of cokes as an example of material, blowing instruction information of reducing agent for instructing blowing in of a reducing agent, tapping instruction information for instructing tapping from a tap hole, or the like.

Note that the control signal is not limited to them, and in the case where the facility is a converter, there may be oxygen blowing instruction information for instructing blowing of oxygen from above the converter, and respective blowing instruction information for instructing blowing of oxygen or fuel gas, carbon dioxide gas, inert gas, or the like from below the furnace, and the like. Moreover, for an operation of charging iron scraps by tilting the converter body or of tilting the converter body again to move molten steel to a ladle after blowing, there may be instruction information for instructing tilting of the converter body, and the like. Further, when the facility is a continuous-casting machine, there may be pressure instruction information for increasing or decreasing pressures, and the like.

To the AR server 1, the control information transmitted from the operation server 5 to the facility is input. Then the AR server 1 performs control to create a virtual image representing the status of the outside or inside of the facility based on the input control information and the input measurement information, and overlay and display the created virtual image and the imaged image input from the camera 2 on the display device 4.

An observer of the factory can comprehend in a realistic manner the operating status of a facility located in an area which is dangerous and off-limits, the operational status of the inside of the facility, and so on by observing the display device 4.

Figure 9:
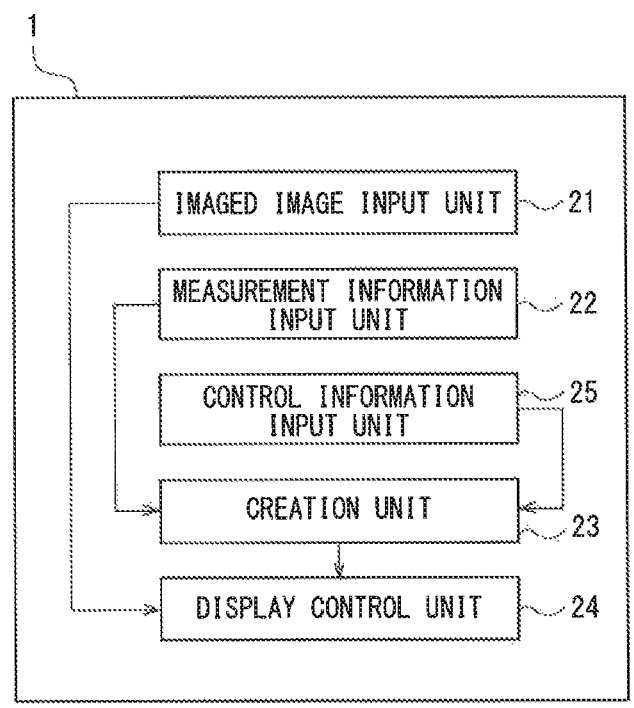
FIG. 9 is a diagram illustrating an example of a software structure of the AR server of Embodiment 2.

FIG. 9 is a diagram illustrating an example of a software structure of the AR server 1 of Embodiment 2.

As illustrated in FIG. 9, the software structure of the AR server 1 of Embodiment 2 newly includes a control information input unit 25 compared to the software structure of the AR server 1 of Embodiment 1.

The control information input unit 25 receives from the operation server 5 the control information transmitted from the operation server 5 to the facility and inputs the control information to the creation unit 23.

The creation unit 23 creates a virtual image representing the status of the outside or inside of the facility based on the measurement information input by the measurement information input unit 22 and the control information input by the control information input unit 25. For example, the creation unit 23 substitutes the measurement information in the facility inside estimation model corresponding to the facility to estimate the status inside the furnace, and creates a virtual image according to the estimation result, as illustrated in Embodiment 1.

Along with this, for example when the control information is the cokes charging instruction information, the creation unit 23 adds an object representing how cokes are charged into the facility to the virtual image based on the control information, thereby making a virtual image representing the final status inside the furnace.

Figure 10:
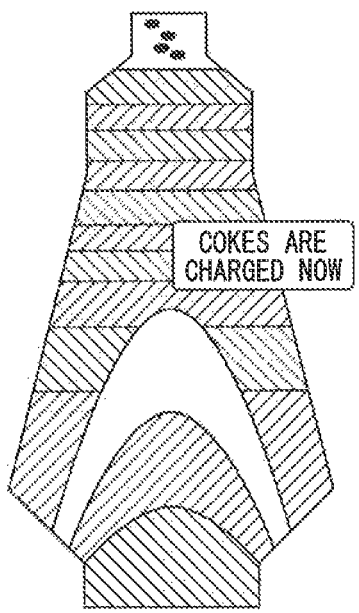
FIG. 10 is a diagram (1) illustrating an example of overlay display of a virtual image and an imaged image of Embodiment 2.

FIG. 10 is a diagram (1) illustrating an example of overlay display of a virtual image and an imaged image of Embodiment 2. FIG. 10 illustrates an example of overlay and display an imaged image of the shaft furnace and a virtual image of the inside of the shaft furnace and cokes being charged into the shaft furnace which is created based on temperature information of the inside of the shaft furnace and the charging instruction information of cokes into the shaft furnace.

According to this embodiment, the creation unit 23 creates the virtual image to which not only the measurement information is added but also the control information is added, and thus a virtual image having more realistic feelings can be created. Particularly in the converter, when the converter body is tilted, the overlay-displayed virtual image changes accompanying the movement, and thus the realistic feeling of the image is increased even further.

Figure 11:
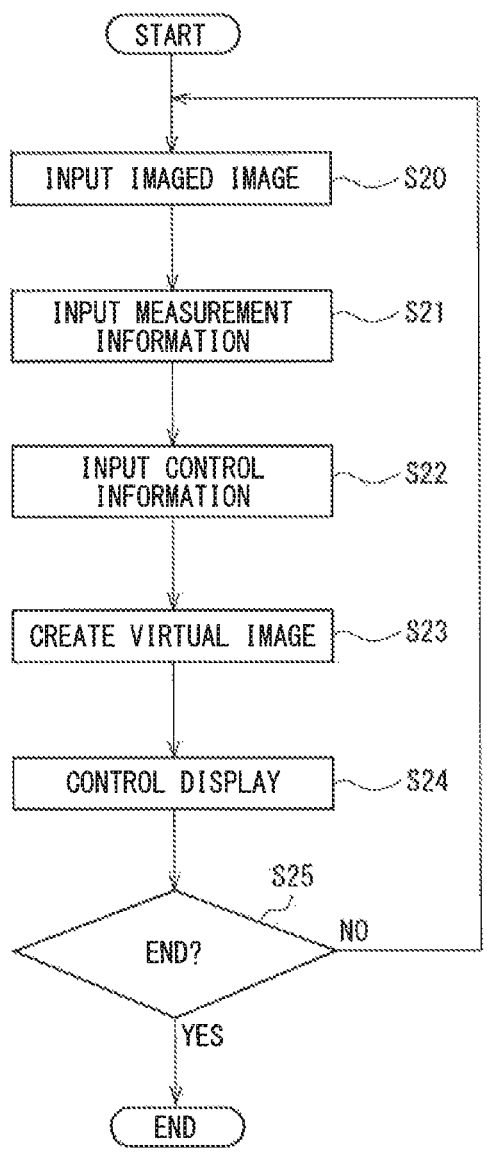
FIG. 11 is a flowchart illustrating an example of display control processing in the AR server of Embodiment 2.

FIG. 11 is a flowchart illustrating an example of display control processing in the AR server 1 of Embodiment 2.

In step S20, the imaged image input unit 21 receives from the camera 2 an imaged image of the facility in the factory which is imaged by the camera 2 and inputs the imaged image to the display control unit 24.

In step S21, the measurement information input unit 22 receives from the sensors $3_1$ to $3_5$ the measurement information measured by the sensors $3_1$ to $3_5$ and inputs the measurement information to the creation unit 23.

In step S22, the control information input unit 25 receives the control information from the operation server 5 and inputs the control information to the creation unit 23. Note that it is assumed that the control information input unit 25 inputs the control information every time the control information is transmitted from the operation server 5 to the facility.

In step S23, the creation unit 23 creates a virtual image representing the status of the outside or inside of the facility based on the measurement information input in step S21 and the control information input in step S22.

In step S24, the display control unit 24 performs control to overlay and display on the display device 4 the virtual image representing the status of the outside or inside of the facility created in step S23 and the imaged image of the facility input in step S20.

In step S25, for example, the display control unit 24 determines whether to end the processing illustrated in FIG. 11 or not based on whether information of ending display or the like is received or not from the display device 4 or the like. The display control unit 24 ends the processing illustrated in FIG. 11 when it determines to end the processing, or returns the processing to step S20 when it determines not to end the processing.

As described above, according to this embodiment, the operating status of a facility or the like can be communicated in a more realistic manner to an observer in an installation or a factory.

Embodiment 3

Depending on the factory, facilities may be in operation throughout the year, or there may be cases where facilities are not in operation for maintenance, cleaning, or the like. In this embodiment, there will be described a method for communicating, even when a facility is not in operation, the operating status of the facility or the like in a realistic manner to an observer in an installation or a factory. Note that a system structure, a software structure, and so on in this embodiment are similar to those of Embodiment 1 unless otherwise noted.

The creation unit 23 of this embodiment determines whether the facility is in operation or not based on the measurement information input from the measurement information input unit 22, and creates a virtual image based on the measurement information when it determines that the facility is in operation, or obtains from the storage device 12 or the like a virtual image generated in advance based on logical values or average values or the like of measurement information in the past when it determines that the facility is not in operation.

For example, the creation unit 23 receives the measurement information from the measurement information input unit 22, and receives facility information indicating which facility this measurement information is measured from the measurement information input unit 22 or the like. Based on the received facility information, the creation unit 23 obtains a virtual image generated in advance and associated with the facility information from the storage device 12 or the like.

FIG. 2 is a flowchart illustrating an example of display control processing in the AR server 1 of Embodiment 3.

In step S30, the imaged image input unit 21 receives from the camera 2 an imaged image of the facility in the factory which is imaged by the camera 2 and inputs the imaged image to the display control unit 24.

In step S31, the measurement information input unit 22 receives from the sensors $3_1$ to $3_5$ the measurement information measured by the sensors $3_1$ to $3_5$ and inputs the measurement information to the creation unit 23.

In step S32, the creation unit 23 determines whether the facility is in operation or not based on the measurement information input from the measurement information input unit 22. The creation unit 23 determines that the facility is not in operation when, for example, the measurement information is not in a predetermined range. The creation unit 23 advances the processing to step S33 when it determines that the facility is in operation, or advances the processing to step S34 when it determines that the facility is not in operation.

In step S33, the creation unit 23 creates a virtual image representing the status of the outside or inside of the facility based on the measurement information input in step S31.

On the other hand, in step S4, the creation unit 23 obtains from the storage device 12 or the like a virtual image representing the status of the outside or inside of the facility, which is created in advance based on logical values or the like corresponding to the facility.

In step S35, the display control unit 24 performs control to overlay and display on the display device 4 the virtual image representing the status of the outside or inside of the facility created in step S33 or obtained in step S34 and the imaged image of the facility input in step S30.

In step S36, for example, the display control unit 24 determines whether to end the processing illustrated in FIG. 12 or not based on whether information of ending display or the like is received or not from the display device 4 or the like. The display control unit 24 ends the processing illustrated in FIG. 12 when it determines to end the processing, or returns the processing to step S30 when it determines not to end the processing.

As described above, according to this embodiment, when the facility is in operation, a virtual image created based on the measurement information is overlaid and displayed on an imaged image of the facility, and thereby the operating status of a facility or the like can be communicated with realistic feelings to an observer in an installation or a factory. Further, according to this embodiment, when the facility is not in operation, a virtual image created based on logical values or average values of measurement information in the past is overlaid and displayed on an imaged image of the facility, and thereby the operating status of a facility or the like can be communicated in a realistic manner to an observer in an installation or a factory.

Note that the system structure, the software structure, and so on of this embodiment are made similar to those in Embodiment 1, but when they are made similar to those in Embodiment 2, the creation unit 23 may be configured to determine whether the facility is in operation or not based on the measurement information and/or the control information. For example, the creation unit 23 may be configured to determine that the facility is not in operation when the measurement information is not in a predetermined range and/or when the control information is not transmitted for a predetermined period from the operation server 5 to the facility.

Embodiment 4

Figure 13A:
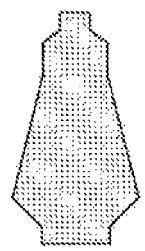
FIG. 13A is a diagram (1) illustrating an example of displaying a facility by each display layer.
Figure 13B:
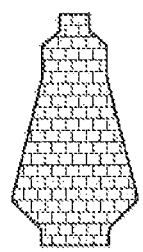
FIG. 13B is a diagram (2) illustrating an example of displaying a facility by each display layer.
Figure 13C:
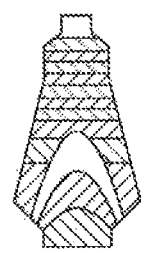
FIG. 13C is a diagram (3) illustrating an example of displaying a facility by each display layer.
Figure 13D:
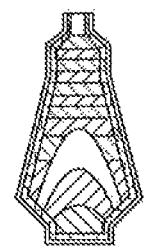
FIG. 13D is a diagram (4) illustrating an example of displaying a facility by each display layer.

The display control unit 24 may be configured to transmit a display layer set for each facility to the display device 4 in response to a screen operation or the like by an observer on the display device 4. FIG. 13A to FIG. 13D are diagrams illustrating an example of displaying the facility by each display layer. FIG. 13A represents an external appearance of a shaft furnace. FIG. 13B represents fireproof bricks inside the shaft furnace. FIG. 13C represents appearances of iron ore and cokes in the shaft furnace. FIG. 13D represents a cross section of the shaft furnace.

When display of a display layer similar to that in FIG. 13A or FIG. 13B is requested from the display device 4, the display control unit 24 performs control to obtain a virtual image of the display layer created in advance from the storage device 12 or the like, and overlay and display on the display device 4 the obtained virtual image of the display layer and the imaged image input by the imaged image input unit 21.

According to this embodiment, a virtual image displaying the operating status of a facility or the like with various types of display layers is overlaid and displayed on an imaged image of the facility in response to a request or the like from an observer, and thereby the operating status of a facility or the like can be communicated with more realistic feelings and in detail to an observer in an installation or a factory.

Embodiment 5

Figure 14:
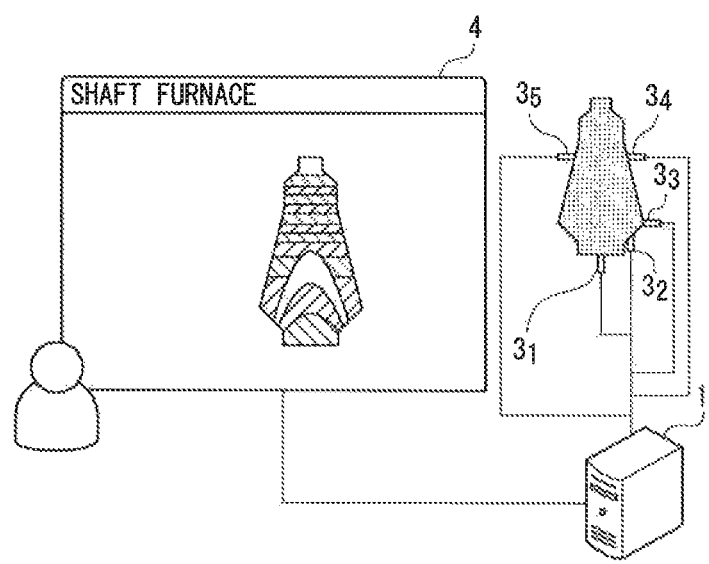
FIG. 14 is a diagram illustrating an example of a system structure of a facility guidance system of Embodiment 5.

FIG. 14 is a diagram illustrating an example of a system structure of a facility guidance system of Embodiment 5. As illustrated in FIG. 14, the system structure of the facility guidance system of Embodiment 5 does not include the camera 2 compared to the system structure of the facility guidance system of Embodiment 1. Further, the display device 4 of this embodiment is a transmissive liquid crystal film fixed to a window or the like for example.

To the AR server 1, measurement information (for example, temperature information of the inside of a shaft furnace, or the like) measured by the sensors $3_1$ to $3_5$ is input from the sensors $3_1$ to $3_5$.

The AR server 1 performs control to create a virtual image representing the status of the outside or inside of the facility based on the input measurement information, and overlay and display the created virtual image on a facility seen through the window or the like on which the display device 4 is provided.

FIG. 1 is a diagram illustrating an example of a software structure of the AR server 1 of Embodiment 5.

Figure 15:
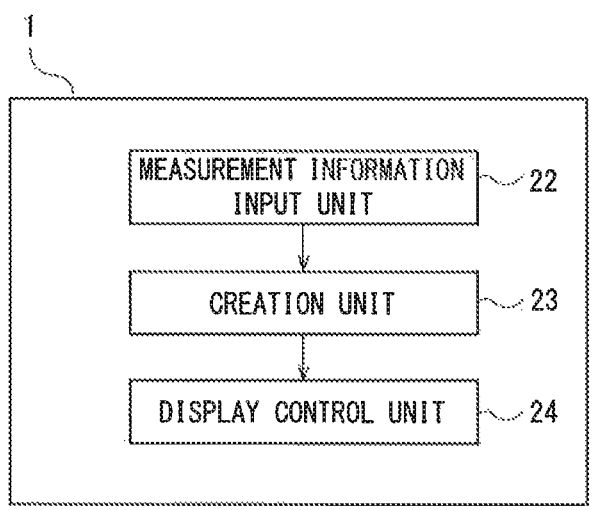
FIG. 15 is a diagram illustrating an example of a software structure of an AR server of Embodiment 5.

As illustrated in FIG. 15, the AR server includes a measurement information input unit 22, a creation unit 23, and a display control unit 24 as a software structure.

The measurement information input unit 22 receives from the sensors $3_1$ to $3_5$ measurement information measured by the sensors $3i$ to $3a$ and inputs the measurement information to the creation unit 23.

The creation unit 23 creates a virtual image representing the status of the outside or inside of the facility based on the measurement information input by the measurement information input unit 22.

The display control unit 24 performs control to overlay and display the virtual image representing the status of the outside or inside of the facility which is created in the creation unit 23 on the facility seen through the window or the like on which the display device 4 is provided.

Figure 16:
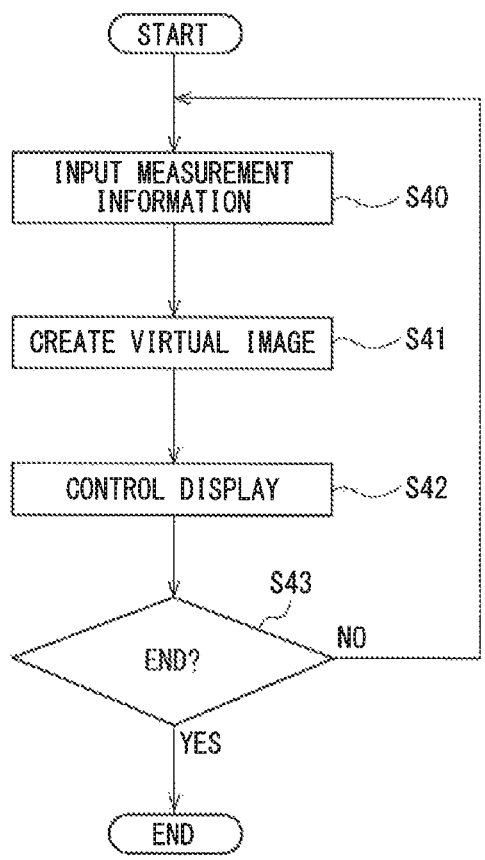
FIG. 16 is a flowchart illustrating an example of display control processing in the AR server of Embodiment 5.

FIG. 16 is a flowchart illustrating an example of display control processing in the AR server 1 of Embodiment 5.

In step S40, the measurement information input unit 22 receives from the sensors $3_1$ to $3_5$ the measurement information measured by the sensors $3_1$ to $3_5$ and inputs the measurement information to the creation unit 23.

In step S41, the creation unit 23 creates a virtual image representing the status of the outside or inside of the facility based on the measurement information input in step S40.

In step S42, the display control unit 24 performs control to overlay and display the virtual image representing the status of the outside or inside of the facility which is created in step S41 on the facility seen through the window or the like on which the display device 4 is provided.

In step S43, for example, the display control unit 24 determines whether to end the processing illustrated in FIG. 16 or not based on whether information of ending display or the like is received or not from the display device 4 or the like. The display control unit 24 ends the processing illustrated in FIG. 16 when it determines to end the processing, or returns the processing to step S40 when it determines not to end the processing.

As described above, also in this embodiment, the operating status of a facility or the like can be communicated in a realistic manner to an observer in an installation or a factory.

Embodiment 6

Even now, when computerized control is growing, control of factory facilities in a steel plant is often performed such that an operator predicts the status of the inside of a shaft furnace or converter from the color of pig iron seen through a viewing window of the shaft furnace, flames bursting up through the converter opening, or the like, and the operator performs control based on a decision made by the operator according to the status at the time. However, this decision is not easy since it requires being skillful, and when the decision by the operator is not appropriate, it may result in causing deterioration of the quality of products produced through the factory facilities.

Accordingly, in this embodiment, there will be described an operation support system which simulates, when control of a factory facility is performed by the operator's decision, how the status of the factory facility (for example, the status of the inside of a shaft furnace or converter) would be when this control is performed, and presents results of the simulation as a three-dimensional image to the operator.

In the facility guidance system of Embodiments 1 to 5, a three-dimensional virtual image representing the current status of the inside of a facility is created based on measurement information and control in formation, and this image is presented to the observer. However, based on information (control schedule information) representing the contents of control to be performed from the present moment besides the measurement information, the operation support system according to Embodiment 6 predicts by simulation how the status of the inside of the facility would change if this control is performed, and presents prediction results to the operator. Considering the prediction results, the operator finally determines what control should be actually performed.

Figure 17:
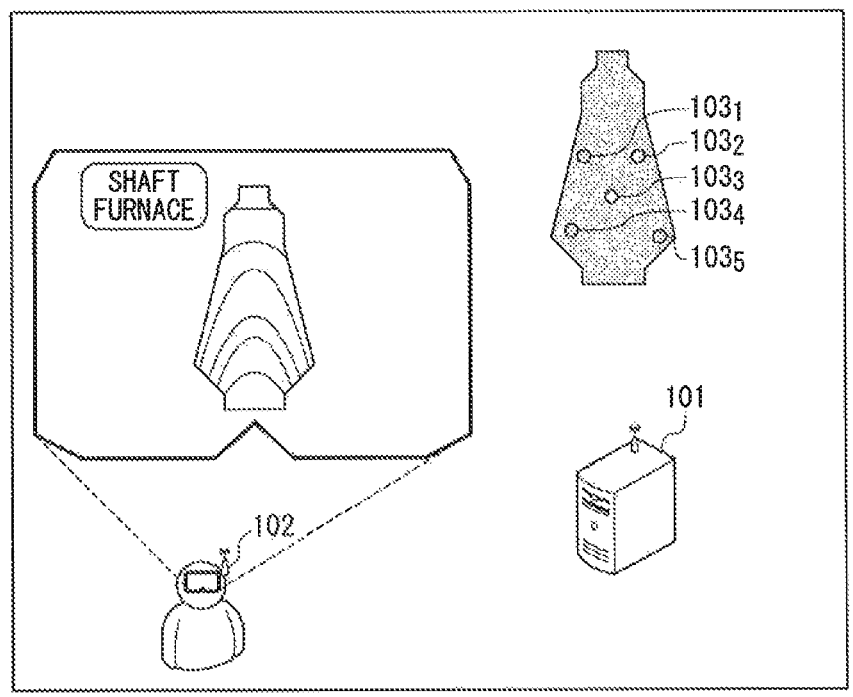
FIG. 17 is a diagram illustrating an example of a system structure of an operation support system of Embodiment 6.

More specifically, the operation support system according to this embodiment is as follows. FIG. 17 is a diagram illustrating an example of a system structure of the operation support system of Embodiment 6. As illustrated in FIG. 17, in the operation support system, a server 101, an HMD 102 with camera (hereinafter abbreviated as HMD 102), and sensors $103_1$ to $103_5$ are connected via a wireless network.

Figure 18:
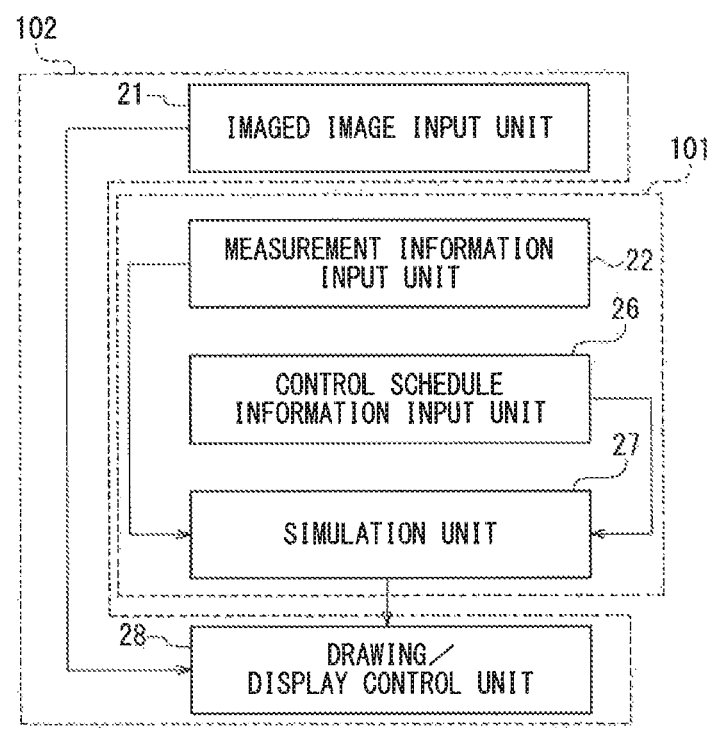
FIG. 18 is a diagram illustrating an example of a software structure of the operation support system of Embodiment 6.

FIG. 18 is a diagram illustrating an example of a software structure of the operation support system of Embodiment 6.

The software structure of the operation support system of this embodiment newly includes a control schedule information input unit 26 as compared to the software structure of the AR server 1 of Embodiment 1.

Further, in this embodiment, functions of software are distributed among the server 101 and the HMD 102. The server 101 includes a measurement information input unit 22, a control schedule information input unit 26, and a simulation unit 27 as a functional structure of software. Further, the HMD 102 has a camera and a drawing function, and includes an imaged image input unit 21 and a drawing/display control unit 28 as a functional structure of software. Note that in this embodiment although the functions of software are distributed among the server 101 and the HMD 102, it may be structured such that the server 101 includes all the functions as in Embodiment 1 or the like, or may be structured such that the HMD 102 includes all the functions, and hence it is not limited in particular.

First, the function of the server 101 will be described.

The measurement information input unit 22 receives measurement information measured by the sensors $103_1$ to $103_5$ as input data from the sensors $103_1$ to $103_5$. At this moment, the sensors $103_1$ to $103_5$ transmit the measurement information to the server 101 via the wireless network.

The control schedule information input unit 26 receives control schedule information input by the operator as input data. As the control schedule information, similarly to the control information, there are charging instruction information of sintered ore or the like, cokes charging instruction information, blowing instruction information of reducing agent, and tapping instruction information for instructing tapping from a tap hole, as well as blowing instruction of oxygen, air, or various types of gas and pressure instruction information. The operator can input the control schedule information via an input device connected to the server, or can input the control schedule information remotely via a portable terminal or the like.

Based on the measurement information received in the measurement information input unit 22 and the control schedule information received in the control schedule information input unit 26, the simulation unit 27 simulates the status of the outside or inside of the facility when control for which contents are represented by the control schedule information is performed. For example, the simulation unit 27 substitutes the measurement information (current temperature of the shaft furnace, or the like) and control schedule information (blowing instruction information representing the amount of blowing oxygen or air via each tuyere, or the like) in the facility inside estimation model corresponding to the facility, performs numerical analysis on the status in the facility, and outputs numeric data representing results thereof.

Note that as a technique using the facility inside estimation model, for example, Japanese Laid-open Patent Publication No. 8-295910 or the like discloses a technique to simulate operation of a shaft furnace by introducing a mathematical expression model modeling the state in the furnace. Using such a technique, data of temperatures, pressures, and so on at each point of three-dimensional coordinates in the furnace can be obtained.

Next, the function of the HMD 102 will be described.

The imaged image input unit 21 receives as input data an imaged image of the facility in the factory imaged by the camera provided in the HMD 102.

Upon reception of numeric data representing simulation results by the simulation unit 27, the drawing/display control unit 28 draws a three-dimensional virtual image based on the numeric data. Moreover, the drawing/display control unit 28 performs control to over lay and display on the display device of the HMD 102 a three-dimensional virtual image representing simulation results of the status of the outside or inside of the drawn facility and the imaged image of the facility input by the imaged image input unit 21. At this time, the server 101 transmits numeric data representing simulation results to the HMD 102 via the wireless network.

Figure 19:
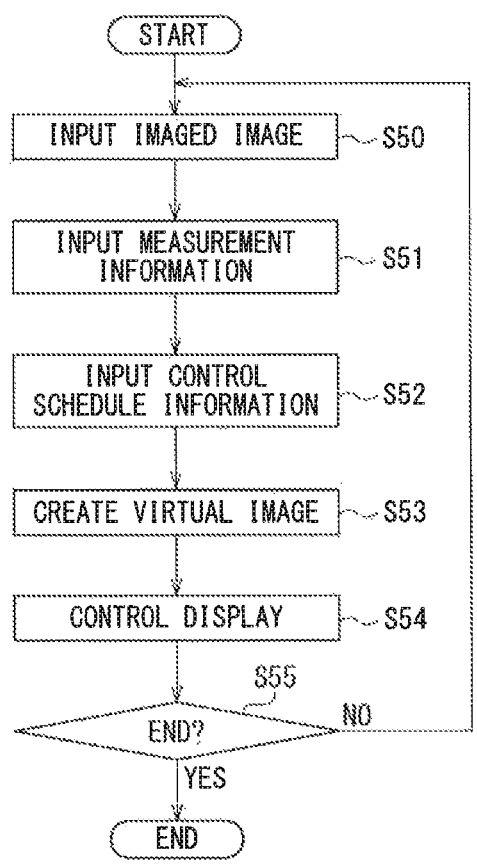
FIG. 19 is a flowchart illustrating an example of processing in the operation support system of Embodiment 6.

FIG. 19 is a flowchart illustrating an example of processing in the operation support system of Embodiment 6.

In step S50, the imaged image input unit 21 receives as input data an imaged image of the facility in the factory imaged by the camera provided in the HMD 102.

In step S51, the measurement information input unit 22 receives measurement information measured by the sensors 103$_1$ to 103$_5$ as input data from the sensors 103$_1$ to 103$_5$.

In step S52, the control schedule information input unit 26 receives control schedule information input by the operator.

In step S53, based on the measurement information input in step S51 and the control schedule information input in step S52, the simulation unit 27 executes simulation estimating the status of the outside or inside of the facility, and outputs numeric data representing simulation results. Then, the drawing/display control unit 28 creates a three-dimensional virtual image based on the numeric data representing the simulation results.

In step S54, the drawing/display control unit 28 performs control to overlay and display on the display (display device) provided in the HMD 102 the three-dimensional virtual image representing the simulation results of the status of the outside or inside of the facility created in step S53 and the imaged image of the facility input in the step S50.

In step S55, for example, the drawing/display control unit 28 determines whether to end the processing illustrated in FIG. 19 or not based on whether information of ending display or the like is received or not from the HMD 103 or the like. The drawing/display control unit 28 ends the processing illustrated in FIG. 19 when it determines to end the processing, or returns the processing step to step S50 when it determines not to end the processing.

Regarding the processing of overlay-displaying the three-dimensional virtual image created by the drawing/display control unit 28 and the imaged image, a more detailed description will be given below, taking an example of using blowing instruction information representing the amount of oxygen or air being blown in via each tuyere according to the control schedule information.

In a large shaft furnace, tuyeres for sending air into the furnace are provided at 30 to 40 positions in a lower part of the main body thereof, where the temperature distribution in the periphery of each tuyere differs when the amount of sending into the tuyere differs.

Accordingly, each tuyere is assigned an ID for identification (hereinafter abbreviated as a tuyere ID), and when the simulation unit 27 executes simulation, blowing instruction information representing the amount of oxygen or air to blown is input with a specified tuyere ID as the control schedule information. Thus, there is input data representing the amount of blowing at each point in the three dimensional coordinates corresponding to each tuyere. Further, as initial values of temperature data at each point in the three-dimensional coordinates in the shaft furnace, there are input values calculated based on the measurement information from the sensors.

Then, the simulation unit 27 performs numerical analysis of the equation of motion of motion of flowing and/or heat conduction equation based on a mathematical expression model representing the state in the shaft furnace with the input control schedule information and measurement information being initial conditions, to thereby calculate various numeric data (temperature data, velocity data, pressure data, and so on) at each point in the three-dimensional coordinates in the shaft furnace after a certain time has passed.

Then, upon reception of the numeric data at each point of the three-dimensional coordinates in the shaft furnace which represent simulation results from the simulation unit 27, the drawing/display control unit 28 generates a three-dimensional virtual image indicating the simulation results (temperature distribution, velocity distribution, pressure distribution, and so on) from the received numeric data.

Moreover, when the drawing/display control unit 28 overlay-displays the created three-dimensional virtual image and the imaged image, for example, the drawing/display control unit identifies the direction and angle of a portion which is seen by the user based on the image of the shaft furnace imaged by the camera provided in the HMD 102. More specifically, the image of the shaft furnace imaged by the camera provided in the HMD 102 is substantially the same as the image of the shaft furnace captured in the visual field of the user, and thus, with images obtained by imaging the shaft furnace in advance from various angles and directions being stored in a memory in the HMD 102 in advance, the direction and the angle of the portion seen by the user is identified by matching the image imaged by the camera of the HMD 102 and the images stored in the memory. Then, based on the identified direction and angle, the drawing/display control unit 28 controls the direction of the three-dimensional virtual image representing the simulation results to be presented to the operator.

Note that it may be structured to allow the operator to adjust the direction of the three-dimensional virtual image by himself/herself via an input device, and hence it is not particularly limited.

This structure allows the operator to recognize in advance, from the simulation results, what status the temperature distribution and the pressure distribution in the shaft furnace or the converter would be due to control to be currently performed by him/her.

Thus, for example, the operator is able to perform scheduled control when the results of simulation inside the shaft furnace indicate a favorable temperature distribution and so on, or reconsider the contents of control and select an appropriate operation when the results of simulation indicate an unfavorable temperature distribution and so on. Therefore, even a less-experienced operator is able to appropriately operate a factory facility such as the shaft furnace, which requires being skillful. Furthermore, since the inside temperature distribution and so on are presented as a three-dimensional virtual image which is overlaid on an actual shaft furnace or converter, the operator is able to comprehend the status inside the facility more intuitively, and is able to instantly and accurately comprehend whether the results of simulation are favorable or not.

Note that in this embodiment, although the case of using the non-transmissive HMD 102 with camera has been described as an example, it may be of a structure including no camera by applying the structure of Embodiment 5 and using a transmissive HMD. That is, the HMD does not include the imaged image input unit 21, and the drawing/display control unit 28 performs control to overlay and display the created three-dimensional virtual image on a facility which is actually seen through the HMD. In this case, when the HMD includes a GPS and an acceleration sensor, the HMD is able to recognize from what direction and angle the user is capturing the facility. Further, the relation between the three-dimensional coordinates used in the simulation and the actual direction of the facility is defined in advance. Thus, even in the HMD having no camera, it is possible to control the direction of the three-dimensional virtual image representing simulation results to be presented to the operator based on the identified direction and angle, and overlay and display the image on the facility seen through the transmissive HMD.

Embodiment 7

In a steel plant, molten iron coming out of a shaft furnace is put in a torpedo car or the like and carried to a steel factory, and charged into a steel furnace in a molten state as it is. Then, assuming that the torpedo car is also a part of factory facilities, a virtual image representing the status inside may be generated and overlay-displayed on the torpedo car to be presented to a worker, similarly to Embodiment 1. Specifically, it may be structured such that measurement information of temperatures and pressures of the inside or surface of the torpedo car, and so on is obtained by sensors, and a virtual image representing a temperature distribution and so on generated based on a facility inside estimation model associated with the torpedo car using this measurement information is overlaid and displayed on the actual torpedo car.

Figure 20:
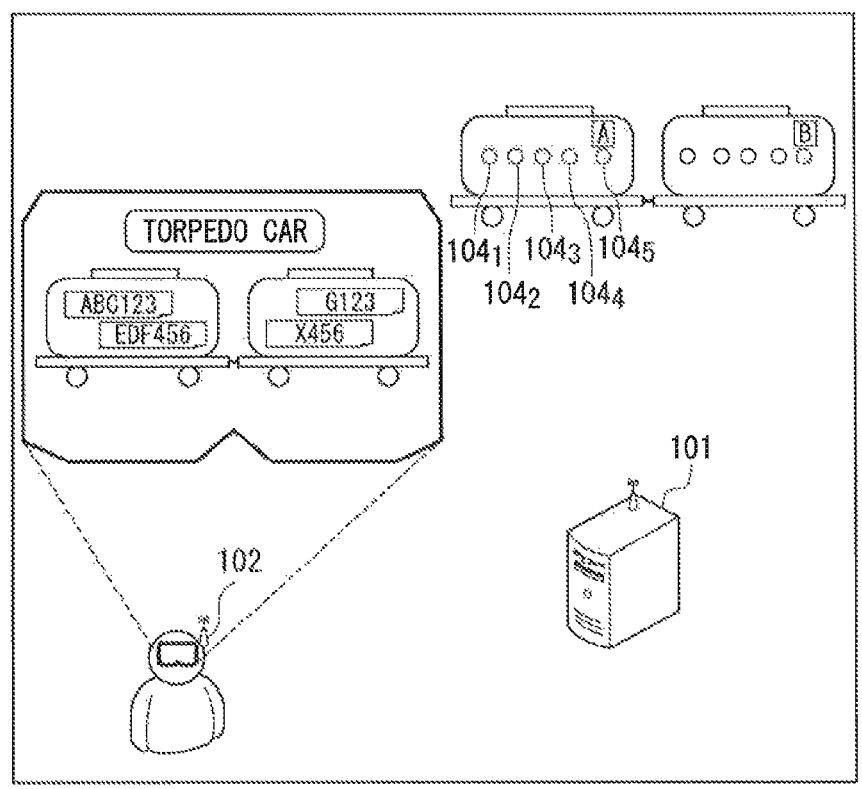
FIG. 20 is a diagram illustrating an example of a system structure of an operation support system of Embodiment 7.

Moreover, in this embodiment, it may be structured to display the order number corresponding to molten iron carried by the torpedo car. Describing in more detail, the operation support system according to this embodiment is as follows. FIG. 20 is a diagram illustrating an example of a system structure of the operation support system of Embodiment 7. As illustrated in FIG. 20, in the operation support system, a server 101, an HMD 102 with camera (hereinafter abbreviated as HMD 102), and sensors $104_1$ to $104_5$ are connected via a wireless network.

Note that in Embodiment 7, the various types of processing performed by the AR server 1 in Embodiment 1 are performed in the HMD 102. Describing in more detail, the function of the HMD 102 is as follows.

The HMD 102 obtains an imaged image of a facility (torpedo car in the example of FIG. 20) in a factory which is imaged by the camera provided integrally in the HMD. Further, the HMD 102 obtains measurement information (for example, temperature information of the inside of the torpedo car, or the like) measured by the sensors $104_1$ to $104_5$ via wireless communication or the like.

Moreover, in this embodiment, a marker for identifying a facility is added to each facility in the factory, and the HMD 102 is capable of identifying each facility by the camera provided in the HMD recognizing each marker. More specifically, the HMD 102 retains in a memory provided in the HMD a facility marker correspondence table illustrated in FIG. 21 in which facility IDs for identifying respective facilities and respective markers are correlated, and identifies each facility by recognizing a marker by the camera and reading the facility ID correlated with the marker from the facility marker correspondence table. FIG. 21 is a diagram illustrating an example of the facility marker correspondence table.

Further, the HMD 102 creates a virtual image representing the status of the outside or inside of the facility based on the obtained measurement information, and performs control to overlay and display the created virtual image and the imaged image imaged by the camera on a display (display device) provided in the HMD.

Moreover, this embodiment has a characteristic in that the HMD 102 generates a virtual image indicating an order number assigned to a product in the facility based on the facility ID, and overlays and displays on the display device provided in the HMD the created virtual image of the order number and the imaged image of the facility imaged by the camera. Describing more specifically, this point is as follows.

In this embodiment, the server 101 stores a facility usage status table illustrated in FIG. 22 in which facility IDs for identifying respective facilities and order numbers are correlated. This facility usage status table is updated by the operator when, for example, data is registered in a production management system in the factory. For example, when an operation to produce pig iron in a shaft furnace is started, the order number associated with the pig iron to be produced from the present moment in the shaft furnace is input by the operator to the production management system, thereby updating the facility usage status table. That is, in this embodiment, the server 101 stores data of the production management system, which is different from the AR server 1 illustrated in FIG. 2. FIG. 22 is a diagram illustrating an example of the facility usage status table.

Note that the hardware structure of the HMD 102 includes, similarly to the AR server 1 illustrated in FIG. 2, a CPU, a storage device (memory), and a communication device, and the CPU executes processing of controlling the HMD 102 based on a program and data included in the storage device, or the like, thereby achieving a software structure and processing according to a flowchart which will be described later.

Figure 23:
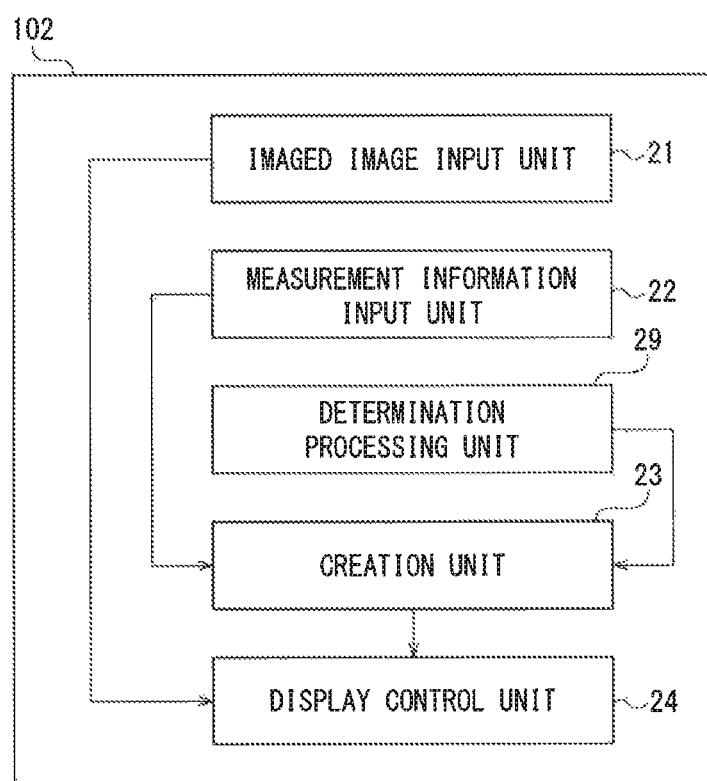
FIG. 23 is a diagram illustrating an example of a software structure of an HMD with camera.

FIG. 23 is a diagram illustrating an example of a software structure of the HMD with camera. As illustrated in FIG. 23, the HMD 102 includes an imaged image input unit 21, a measurement information input unit 22, an identification processing unit 29, a creation unit 23, and a display control unit 24 as a software structure.

The imaged image input unit 21 receives as input data an imaged image of a facility in a factory imaged by the camera provided in the HMD 102.

The measurement information input unit 22 receives measurement information measured by the sensors $3_1$ to $3_5$ as input data from the sensors $3_1$ to $3_5$.

The identification processing unit 29 identifies an order number assigned to a product in each facility. More specifically, the identification processing unit 29 reads the facility ID corresponding to the marker added to the facility in the factory which is captured by the camera from the above-described facility marker correspondence table.

In the example illustrated in FIG. 20, when the camera provided in the HMD captures a marker A added to a torpedo car A and a marker B added to a torpedo car B, the identification processing unit 29 reads a facility ID corresponding to each marker from the facility marker correspondence table, and identifies that the facility to which the marker A is added is the torpedo car A, and that the facility to which the marker B is added is the torpedo car B.

Moreover, the identification processing unit 29 reads the order number corresponding to each facility ID from the above-described facility usage status table, and identifies the order number assigned to a product or the like in each facility.

In the example illustrated in FIG. 20, when the identification processing unit 29 identifies the torpedo car A and the torpedo car B, the identification processing unit reads the order IDs corresponding to respective facility IDs from the facility usage status table, and identifies that the pig irons of the order IDs "ABC123", "EDF456" are carried in the torpedo car A, and pig irons of the order IDs "G123", "X456" are carried in the torpedo car B.

The creation unit 23 creates a virtual image representing the status of the outside or inside of the facility based on the measurement information input by the measurement information input unit 22. Further, the creation unit 23 creates a virtual image representing the order numbers identified in the identification processing unit 29.

The display control unit 24 performs control to overlay and display on the display device of the HMD 102 the virtual image representing the status of the outside or inside of the facility which is created in the creation unit 23 and the imaged image of the facility input by the imaged image input unit 21. Further, the display control unit 24 performs control to overlay and display on the display device of the HMD 102 the virtual image representing the order numbers which is created in the creation unit 23 and the imaged image of the facility input by the imaged image input unit 21.

FIG. 20 illustrates how the virtual image representing the order numbers which is created in the creation unit 23 is overlaid by the display control unit 24 on the image of the torpedo cars imaged by the camera in the HMD 102.

Note that although FIG. 20 does not illustrate an example of overlaying the virtual image representing the status of the outside or inside of the facility, it can be displayed by switching display layers using the structure of Embodiment 4.

Further, in the example illustrated in FIG. 20, although the structure using a marker for identifying a factory facility is described, a wireless IC tag or the like such as RFID may be used for identifying a factory facility instead of the marker. Specifically, it may be structured such that the HMD 102 includes a reader function for a wireless IC tag, a wireless IC tag storing a facility ID is added to each facility, and the facility ID is read directly therefrom, and hence it is not limited in particular.

Figure 24:
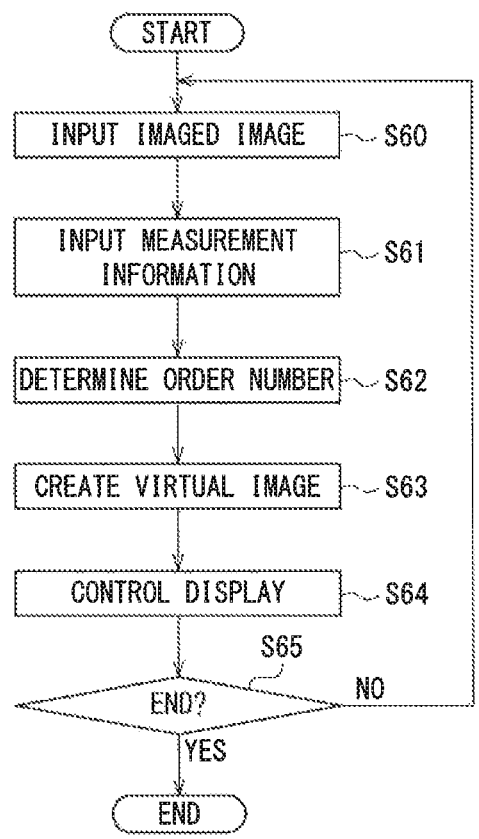
FIG. 24 is a flowchart illustrating an example of processing in the operation support system of Embodiment 7.

FIG. 24 is a flowchart illustrating an example of processing in the operation support system of Embodiment 7.

In step S60, the imaged image input unit 21 receives an imaged image of a facility in a factory which is imaged by the camera provided in the HMD 102 and inputs the imaged image to the display control unit 24.

In step S61, the measurement information input unit 22 receives from the sensors $3_1$ to $3_5$ measurement information measured by the sensors $3_1$ to $3_5$ and inputs the measurement information to the creation unit 23.

In step S62, the identification processing unit 29 identifies the facility ID of each facility based on a marker captured by the camera provided in the HMD 102, and further identifies the order number of a product or the like stored in each facility based on the identified facility ID.

In step S63, the creation unit 23 creates a three-dimensional virtual image representing the status of the outside or inside of the facility based on the measurement information input in step S61. Further, the creation unit 23 creates a virtual image representing an order number based on the order number identified in step S62.

In step S64, the display control unit 24 performs control to overlay and display on the display device 4 the three-dimensional virtual image representing the status of the outside or inside of the facility which is created in step S63 and the imaged image of the facility input in step S60. Further, the display control unit 24 performs control to overlay and display on the display device 4 the virtual image representing the order number created in step S63 and the imaged image of the facility input in step S60.

In step S65, for example, the display control unit 24 determines whether to end the processing illustrated in FIG. 24 or not based on whether information of ending display or the like is received or not from the display device 4 or the like. The display control unit 24 ends the processing illustrated in FIG. 24 when it determines to end the processing, or returns the processing step to step S60 when it determines not to end the processing.

Note that this embodiment can be applied not only to facilities in a factory but also to a product itself waiting for shipment. In this case, it may be structured such that S61 is skipped, because it is unnecessary to overlay-display a virtual image representing the appearance of the inside or outside of a facility, and the processing of generating a virtual image representing the appearance of the outside or inside of the facility in S63 is not performed, and hence it is not limited in particular.

Figure 25:
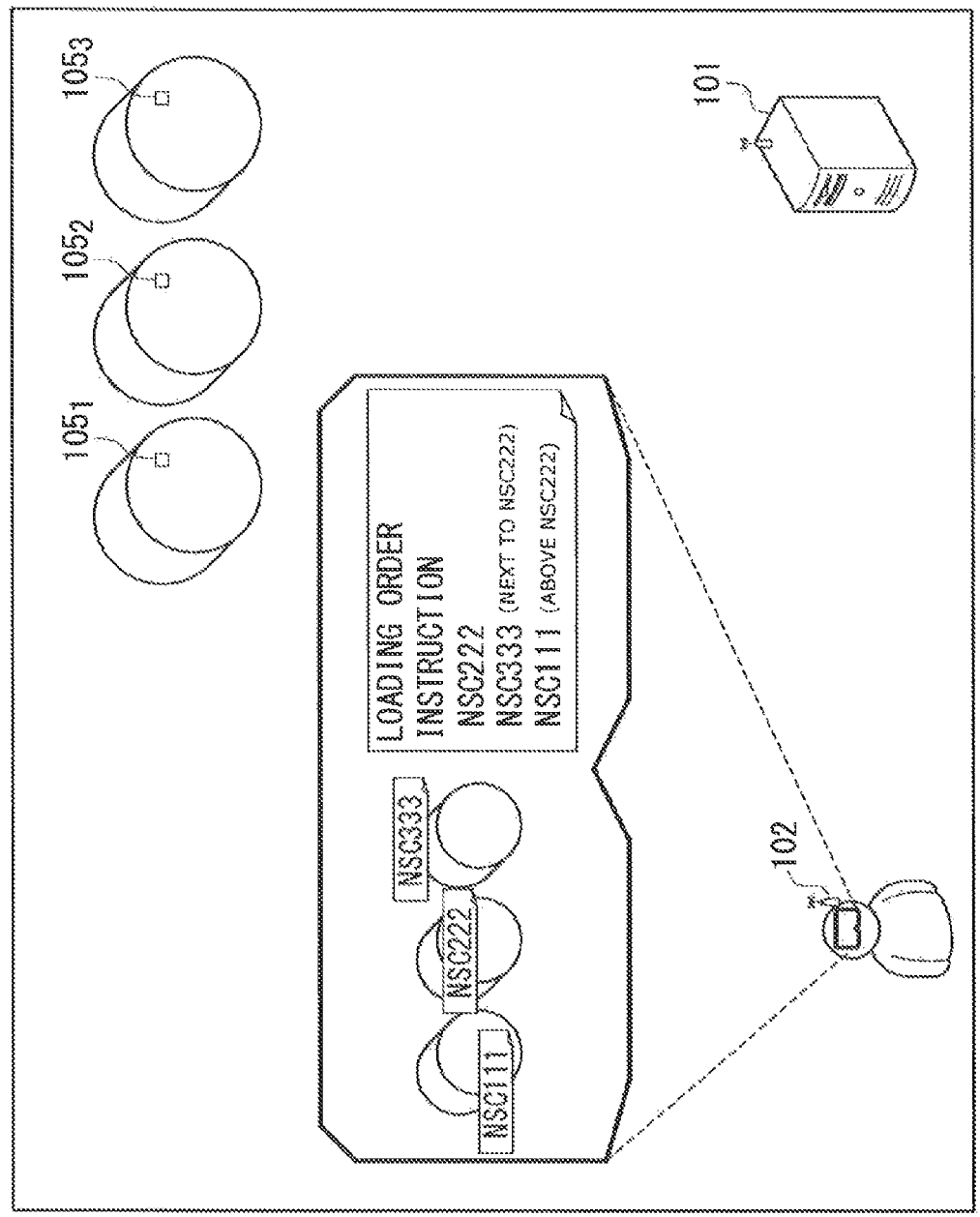
FIG. 25 is a diagram illustrating an example of a system structure of the operation support system of Embodiment 7.

FIG. 25 is a diagram illustrating an example of the system structure of the operation support system of Embodiment 7. In the example illustrated in FIG. 25, an example of displaying order numbers on coils waiting for shipment is illustrated in this example, markers $105_1$ to $105_3$ are added to the coils waiting for shipment, and by capturing these markers with the HMD 102, the order numbers of the respective coils can be obtained. However, details of processing contents are similar to the example described using FIG. 20, and thus the description thereof is omitted.

Further, in the example illustrated in FIG. 25, not only the order numbers are displayed by AR, but also a loading order instruction is displayed by AR. In this case, the operator registers information related to the order of loading (information defining the order of loading or the like using order numbers) in advance in the server 101. Then, when the identification processing unit 29 identifies order numbers of products, the information related to the order of loading registered in the server 101 is read at the same time, and the creation unit 23 creates a virtual image representing the loading order instruction.

Thus, just by looking at a facility or a product in a factory, a worker can immediately comprehend an assigned order number and the order of loading regarding products, half finished products, materials, and/or the like stored in a facility, and thus operations such as preparation for shipment and transportation to the next process can be performed smoothly, and mistakes in operation can be prevented.

Note that also in this embodiment, although the case of using the non-transmissive HMD 102 with camera has been described as an example, it may be of a structure including no camera by applying the structure of Embodiment 5 and using a transmissive HMD. In this case, the HMD) does not include the imaged image input unit 21, and the creation unit 23 performs control to overlay and display the created three-dimensional virtual image on a facility which is actually seen through the HMD.

In the foregoing, preferred embodiments of the resent invention have been described in detail, but the present invention is not limited to such specific embodiments. Various variations and modifications may be made within the scope of the spirit of the present invention described in the claims.

For example, the above-described embodiments are described with examples of showing the appearance of the inside of a facility, such as a shaft furnace or a converter in a steel plant, the inside of which is difficult to be seen. However, the above-described embodiments may also be applied to a facility handling liquid or powder in a transparent casing in the case of food manufacturing industry, chemical or pharmaceutical manufacturing industry, or the like. When the above-described embodiments are applied in such a facility, liquid or powder which is being charged can be shown directly to an observer, and attributes (material name, temperature, viscosity, acidity, alcohol content, amount per charge, and so on) of the liquid or powder can be overlay-displayed in the form of display like a tag. In this manner, more specific information can be obtained from tag information while observing an operating status in real time, and thus more intelligible observation trip service can be provided to an observer.

Further, although the above-described embodiments are described taking examples of what is called a non-transmissive display or a transmissive display, the present invention can also be applied to a non-transmissive projector or a transmissive projector. For example, instead of the display device 4, a display device having a display unit in an eyeglass form which is worn on an observer's head or the like may be used. Further, for example, when overlaying and displaying an imaged image and a virtual image, the AR server 1 aligns the coordinates of the imaged image and the virtual image. As a method for aligning coordinates, for example, there is a method to dispose a fixed marker in advance on a facility, and align the coordinates of the imaged image and the virtual image based on the fixed marker in an image imaged by the camera 2. Note that when the display device having the display unit in an eyeglass form which is worn on an observer's head or the like is used, the AR server 1 presumes where the observer is looking at based on position information, direction information, and so on from the display device, and aligns the coordinates to match the presumed position.

Note that the above-described embodiments may be combined arbitrarily and implemented.

Note that the above-described AR server 1 is an example of a computer.

Embodiment 8

Figure 26:
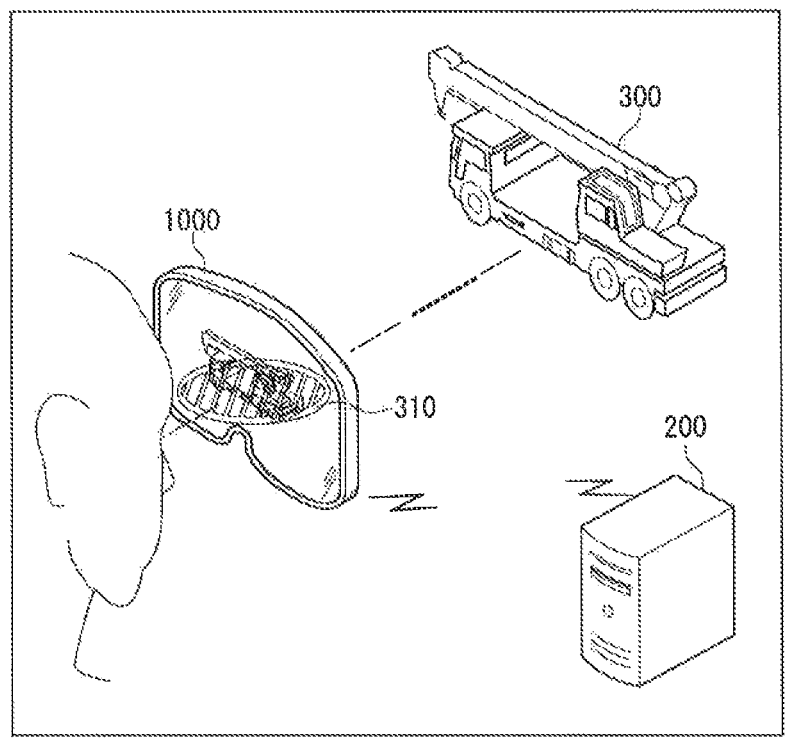
FIG. 26 is a diagram illustrating an example of a structure of an information providing system.

FIG. 26 is a diagram illustrating an example of a structure of an information providing system according to this embodiment. The information providing system has an AR providing apparatus 1000 and an information processing apparatus 200. The AR providing apparatus 1000 and the information processing apparatus 200 are connected communicably via a network.

The AR providing apparatus 1000 is an example of an information providing apparatus (computer), is an HMD (Head Mounted Display) or the like, and provides augmented reality (AR) by displaying an image (computer graphics image) generated in the AR providing apparatus 1000 at a position which matches a real space which can be perceived via the AR providing apparatus 1000. The AR providing apparatus 1000 overlays and displays, on a crane truck 300 in a real space for example, a dangerous range image 310 indicating a dangerous range due to the crane truck 300. Note that the information processing apparatus 200 is a server computer for example, and manages various types of information related to a dangerous object (which is an example of a dangerous target) such as the crane truck 300. In addition, the dangerous target, is not limited to the dangerous object itself but includes a place or a space related to a danger, such as a road where a large, unspecified number of dangerous objects pass by frequently.

Figure 27:
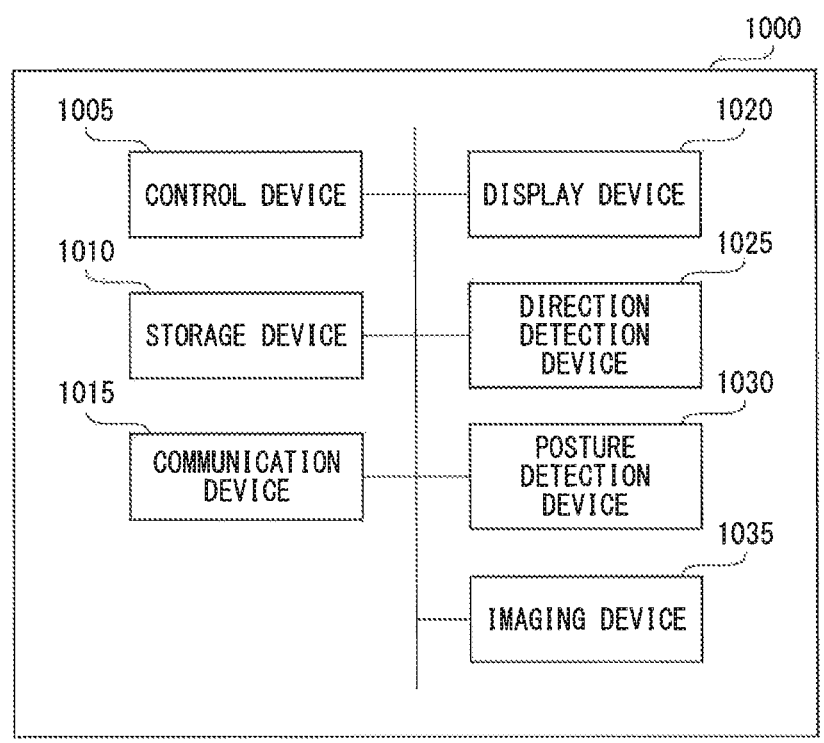
FIG. 27 is a diagram illustrating an example of a hardware structure of an AR providing apparatus.

FIG. 27 is a diagram illustrating an example of a hardware structure of the AR providing apparatus 1000.

The AR providing apparatus 1000 has a control device 1005, a storage device 1010, a communication device 1015, a display device 1020, a direction detection device 1025, a posture detection device 1030, and an imaging device 1035.

The control device 1005 is a CPU (Central Processing Unit) for example, and reads a program from the storage device 1010 as necessary and executes the program. By the program being executed, there are achieved functions in the AR providing apparatus 1000 which will be described later and processing related to flowcharts which will be described later.

The storage device 1010 is a ROM (Read Only Memory), a RAM (Random Access Memory), an HD (Hard Disk), and/or the like and stores various types of information. Described in more detail, the storage device 1010 (ROM) stores a program and the like which are read first when the power of the AR providing apparatus 1000 is turned on. Further, the storage device 1010 (RAM) functions as a main memory of the AR providing apparatus 1000. Further, the storage device 1010 (HD) stores numeric data and the like calculated by the control device 1005 other than the program. Note that the AR providing apparatus 1000 may obtain various types of information to be stored in the storage device 1010 from a recording medium such as a CD-ROM, or may download them via a network or the like.

The communication device 1015 performs communication via wire or wirelessly with the information processing apparatus 200 to obtain various types of information related to a dangerous object. Further, the communication device 1015 performs communication with a satellite, which is an example of a position detection device, to obtain orbit information.

The display device 1020 is an example of a display unit, is a transmissive liquid crystal display or the like, and displays various types of images.

The direction detection device 1025 is an electronic compass for example, detects weak geomagnetism (for example, geomagnetism in a forward and backward direction and geomagnetism in a leftward and rightward direction), and calculates the direction (direction information) of the AR providing apparatus 1000 by calculating the direction of the north from the intensity of the geomagnetism.

The posture detection device 1030 is a gyro sensor for example, detects the angular velocity of an object and calculates an angle (posture of the AR providing apparatus 1000 (posture information)) by integrating the angular velocity, or the like.

The imaging device 1035 performs imaging of a real space.

Note that the hardware structure of the AR providing apparatus 1000 is not limited to this. For example, a direction posture detection device having a function integrating the functions of the direction detection device 1025 and the posture detection device 1030 may be employed instead of the direction detection device 1025 and the posture detection device 1030.

Figure 28:
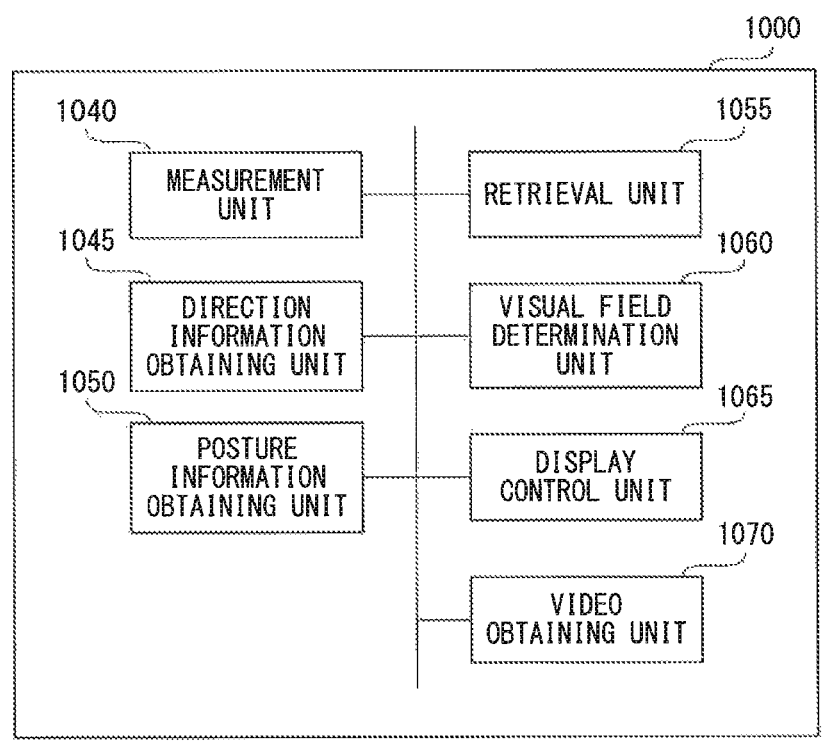
FIG. 28 is a diagram illustrating an example of a functional structure of the AR providing apparatus.

FIG. 28 is a diagram illustrating an example of a functional structure of the AR providing apparatus 1000.

The AR providing apparatus 1000 has a measurement unit 1040, a direction information obtaining unit 1045, a posture information obtaining unit 1050, a retrieval unit 1055, a visual field determination unit 1060, a display control unit 1065, and a video obtaining unit 1070.

The measurement unit 1040 is an example of a position information obtaining unit and calculates (calculates and obtains) information (AR position information as an example of apparatus position information) indicating the current position of the AR providing apparatus 1000 from the orbit information obtained from a satellite via the communication device 1015.

The direction information obtaining unit 1045 obtains direction information calculated in the direction detection device 1025. Note that the direction information obtaining unit 1045 may receive detected information such as geomagnetism from the direction detection device 1025 and calculate the direction information.

The posture information obtaining unit 1050 obtains posture information calculated in the posture detection device 1030. Note that the posture information obtaining unit 1050 may receive detected information such as angular velocity from the posture detection device 1030 and calculate posture information.

The retrieval unit 1055 retrieves (reads) necessary information from tables (positionally fixed target table which will be described later, mobile target table which will be described later, and so on) storing information, which is used when a dangerous range image indicating the dangerous range due to a dangerous object is generated, as various types of information related to dangerous objects from a storage device 230 which will be described later and is included in the information processing apparatus 200.

The visual field determination unit 1060 determines (estimates) the visual field (AR visual field) of the user wearing the AR providing apparatus 1000 based on the direction information obtained in the direction information obtaining unit 1045, the posture information obtained in the posture information obtaining unit 1050, and so on.

The display control unit 1065 generates an augmented image based on the direction information obtained in the direction information obtaining unit 1045, the posture information obtained in the posture information obtaining unit 1050, the information retrieved in the retrieval unit 1055, and so on and displays the augmented image on the display device 1020. At this moment, the display control unit 1065 performs alignment of coordinates for displaying the augmented image matched with the dangerous object in the real space on the display device 1020.

To accurately perform alignment of coordinates (geometric alignment) between the real space and the displayed space (virtual space), it is necessary to match parameters (internal parameters and external parameters) for generating an augmented image of a virtual space with parameters of the display device 1020. Internal parameters of the display device 1020 are known, and thus the problem of geometric alignment eventuates in a problem to obtain external parameters of the display device 1020 (that is, the position and posture of the AR providing apparatus 1000).

Here, to obtain the position and posture or the AR providing apparatus 1000, it is possible to employ various methods by appropriately combining the direction detection device 1025 (magnetic sensor), the posture detection device 1030 (gyro sensor), the control device 1005 (GPS), and the display device 1020. In other words, they can be roughly categorized into methods using measurement results by sensors (AR position information, direction information, and posture information), methods to use an image imaged by the display device 1020, and methods to complement a displacement in alignment by a combination of the display device 1020 and sensors.

In this embodiment, on the assumption that the internal parameters (focal distance, lens distortion, aspect ratio, and so on) of the display device 1020 are calibrated in advance, the description will be given employing a method in which the display control unit 1065 obtains the AR position information, the direction information, and the posture information of the AR providing apparatus 1000 which are measured, so as to obtain a geometric transformation matrix between a virtual coordinate system representing a virtual environment and a reference coordinate system of a real space which is given in advance (conversion information correlating conversion between a virtual coordinate system and a reference coordinate system).

Note that as described above, the display control unit 1065 may obtain the geometric transformation matrix by estimating, for example, the external parameters (position and posture) of the display device 1020 in real time using some kind of coordinates existing in an imaged image. At this time, as the index for estimating the position and posture of the AR providing apparatus 1000, an intentionally added index such as a marker may be used, or natural characteristics such as contour information, brightness edge and feature points may be used.

The video obtaining unit 1070 obtains video data of the real space imaged in the imaging device 1035.

Figure 29:
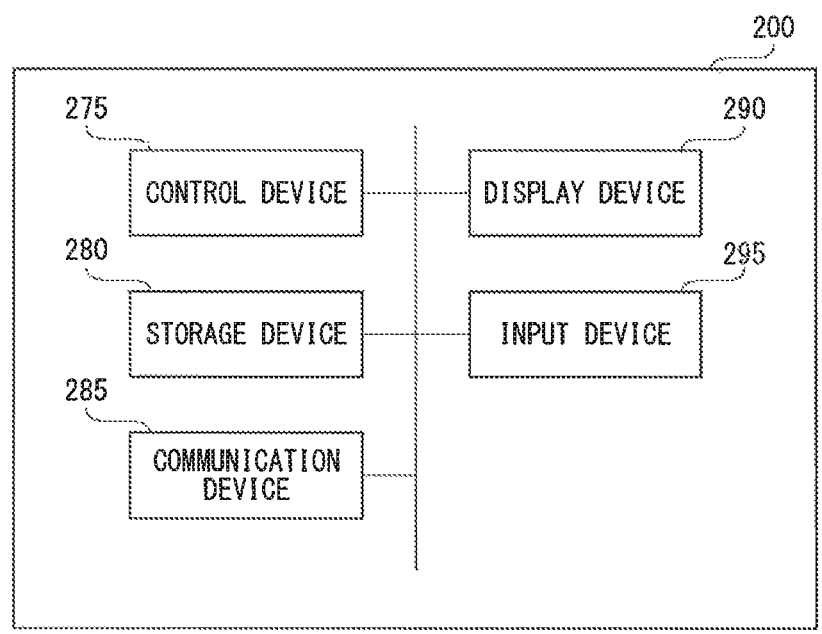
FIG. 29 is a diagram illustrating an example of a hardware structure of an information processing apparatus.

FIG. 29 is a diagram illustrating an example of a hardware structure of the information processing apparatus 200.

The information processing apparatus 200 has a control device 275, a storage device 280, a communication device 285, a display device 290, and an input device 295.

The control device 275 is a CPU (Central Processing Unit) for example, and reads a program from the storage device 280 as necessary and executes the program. By the program being executed, there are achieved functions in the information processing apparatus 200 which will be described later and processing related to flowcharts which will be described later.

The storage device 280 is an example of a storage unit and is a ROM (Read Only Memory), a RAM (Random Access Memory) an HD (Hard Disk), and/or the like and stores various types of information. Describing in more detail, the storage device 280 (ROM) stores a program and the like which are read first when the power of the information processing apparatus 200 is turned on. Further, the storage device 280 (RPAM) functions as a main memory of the information processing apparatus 200. Further, the storage device 280 (HD) stores numeric data and the like calculated by the control device 275 other than the program. Note that the information processing apparatus 200 may obtain various types of information to be stored in the storage device 280 from a recording medium such as a CD-ROM, or may download them via a network or the like.

The communication device 285 communicates with an operating state detection sensor detecting a state that a dangerous object is operating (operating state) and obtains information (dangerous object position information which is an example of dangerous target position information) or the like indicating the current position of the dangerous object from the operating state detection sensor.

The display device 290 is a liquid crystal display or the like and displays various types of information.

The input device 295 is a keyboard and a mouse or the like operated by the user, and inputs various types of information to the information processing apparatus 200.

FIG. 30 is a diagram illustrating an example of a table (positionally fixed target table 210) storing information related to dangerous objects.

The positionally fixed target table 210 is structured to include information of dangerous object ID, dangerous object name, type of danger, reference position, state, dangerous range of each state, and current status. Various types of information excluding the information of current status are set via the input device 295 or the like by an administrator for example. The setting of the information of current status will be described later.

The information of dangerous object ID is identification information for identifying a dangerous object. The information of dangerous object name is information indicating the name of a dangerous object. The information of type of danger is information indicating the type of danger due to a dangerous object.

The information of reference position is information indicating the position (latitude and longitude) where the dangerous object is installed (installation position information) Note that the installation position information is information indicating the position of a fixed dangerous object and indicates the current position of the dangerous object, and hence is equivalent to dangerous object position information. Further, the installation position information can also be used as information identifying a position where a dangerous range image is displayed (display position information). Here, for example, in the case of position information with the latitude of "35.354417" and the longitude of "139.867623", it is represented as position information "35.354417, 139.867623". In this embodiment, for the convenience of explanation, the altitude of a dangerous object to be handled is assumed as "0".

The information of state is information for identifying the operating state of a dangerous object (state identification information). In FIG. 30, two types of state identification information are presented. The first is state identification information ("9:00 to 17:00", operating hours, or the like) for identifying whether the dangerous object is in operation or not based on the current time. The second is state identification information (when fully operating, when only east side is operating, and so on) for identifying what mode the dangerous object is operating in based on the mode of the dangerous object when it operates (or is operating).

The information of dangerous range of each state is an example of dangerous range information and is information indicating the dangerous range corresponding to the state of a dangerous object. The information of current status is information indicating whether a dangerous object is in operation or not. In this embodiment, when a dangerous object is in operation, "○" is set by the information processing apparatus 200, and nothing is set (or it is cleared) when the dangerous object is not in operation.

FIG. 31 is a diagram illustrating an example of a table (mobile target table 220) storing information related to dangerous objects.

The mobile target table 220 is structured to include information of dangerous object ID, dangerous object name, type of danger, positioning reference, state, dangerous range of each state, current status, and current, position. Various types of information excluding the information of current status and the information of current position are set via the input device 295 or the like by an administrator for example. The setting of the information of current status and the information of current position will be described later.

The information of positioning reference is information indicating the position where a dangerous range image is displayed (display position information). The information of current position is information indicating the current position of a dangerous object (dangerous object position information). Note that the descriptions of the same items as those illustrated in FIG. 30 are omitted.

Here, in this embodiment, although the information related to dangerous objects are stored in the form of a table and in plural tables according to the types of dangerous objects (whether it is a fixed dangerous object, whether it is a moving dangerous object, or the like), it is not limited to this structure. For example, a structure to store information related to dangerous objects as one or plural files may be employed. Further, for example, a structure to store information related to dangerous objects as one table may be employed.

Figure 32:
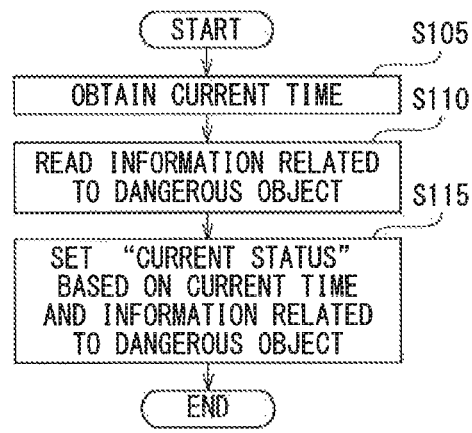
FIG. 32 is a diagram illustrating an example of a flowchart related to operating state setting processing.

FIG. 32 is a diagram illustrating an example of a flowchart related to processing of setting the "current status" (operating state setting processing) which is performed by an operating state setting unit, which is an example of the function of the information processing apparatus 200. Note that the processing of the flowchart illustrated in FIG. 32 is performed at certain intervals (for example, every minute).

First, the operating state setting unit obtains the current time (step S105).

Next, the operating state setting unit reads information related to a dangerous object from the storage device 280 (step S110).

Next, the operating state setting unit sets a "current status" based on the current time and the information related to the dangerous object (step S115) and finishes the operating state setting processing.

More specifically, the operating state setting unit reads the information related to the dangerous object sequentially, and when the information of state is the state identification information (time period) for identifying whether the dangerous object is in operation or not based on the current time, the operating state setting unit determines whether the current time is included in this time period or not. At this moment, the operating state setting unit sets "○" to the "current status" when it determines that the current time is included in this time period. On the other hand, the operating state setting unit clears the "current status" when it determines that the current time is not included in this time period.

Here, an example of performing the processing of the flowchart of FIG. 32 when the current time is "15:00" will be described.

First, in step S105, the operating state setting unit obtains the current time "15:00".

Next, in step S110, the operating state setting unit reads the information of state from the positionally fixed target table 210 and the mobile target table 220.

Next, in step S115, the operating state setting unit sets the "current status" corresponding to the information of state one by one. For example, when a time period "9:00 to 17:00" is read as the information of state, the operating state setting unit determines whether the current time "15:00" is included in the time period "9:00 to 17:00" or not. Then, the operating state setting unit determines that the current time "15:00" is included in the time period "9:00 to 17:00" and sets "○" to the "current status" corresponding to the information of state (time period "9:00 to 17:00").

Note that the processing of setting the "current status" is not limited to the above-described processing. For example, instead of the processing of step S105 to step S115, the operating state setting unit may perform processing to receive information indicating the presence/absence of operation of the dangerous object from the operating state detection sensor, determine whether the dangerous object is actually operating or not, and set "○" to the "current status" when it determines that the dangerous object is operating or clear the "current status" when it determines that the dangerous object is not operating.

Figure 33:
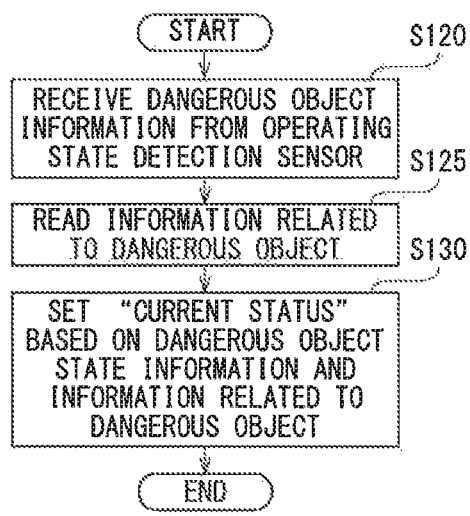
FIG. 33 is a diagram illustrating an example of a flowchart related to operating state setting processing.

FIG. 33 is a diagram illustrating an example of a flowchart related to processing of setting the "current status" (operating state setting processing) which is performed by the operating state setting unit, which is an example of the function of the information processing apparatus 200. Note that the processing of the flowchart illustrated in FIG. 33 is performed upon reception of dangerous object state information from the operating state detection sensor.

First, the operating state setting unit receives dangerous object state information from the operating state detection sensor (step S120). The dangerous object state information includes the information of dangerous object ID and information (operating mode information) indicating the mode of operation of a dangerous object. For example, as the operating mode information, "0" is set when the dangerous object is not operating, "1" is set when the dangerous object is operating in a first mode, "2" is set when the dangerous object is operating in a second mode, and so on.

Next, the operating state setting unit reads information related to a dangerous object from the storage device 280 (step S125). More specifically, the operating state setting unit reads information related to the dangerous object corresponding to the information of dangerous object ID included in the dangerous object state information.

Next, the operating state setting unit sets the "current status" based on the received dangerous object state information and the information related to the dangerous object (step 130), and finishes the operating state setting processing.

More specifically, when the "state" corresponding to the operating mode information included in the dangerous object state information can be determined from the read information related to the dangerous object, the operating state setting unit sets "○" to the "current status" corresponding to the identified "state". On the other hand, when it cannot be determined (the case where the operating mode information indicates that the dangerous object is not in operation), the operating state setting unit clears all the read "current statuses".

Here, an example of performing the processing of the flowchart of FIG. 33 when the dangerous object state information (dangerous object ID "001", operating mode information "2") is received from the operating state detection sensor detecting an operating state of a dangerous object ID "001" will be described.

First, in step S120, the operating state setting unit receives the dangerous object state information from the operating state detection sensor detecting the operating state of a dangerous object "crane" of the dangerous object ID "001".

Next, in step S125, the operating state setting unit reads states "when fully operating" and "when only east side is operating" corresponding to the dangerous object ID "001" from the positionally fixed target table 210 and the mobile target table 220. In this embodiment, it is assumed that as the state "when fully operating", "1" is defined as an operation in the first mode, and as the state "when only east side is operating", "2" is defined as an operation in the second mode.

Next, in step S130, the operating state setting unit determines the state "when only east side is operating" corresponding to the operating mode information "2" included in the dangerous object state information from the read state "when fully operating: 1" and "when only east side is operating: 2", and sets "○" to the "current status" corresponding to the determined state "when only east side is operating".

Figure 34:
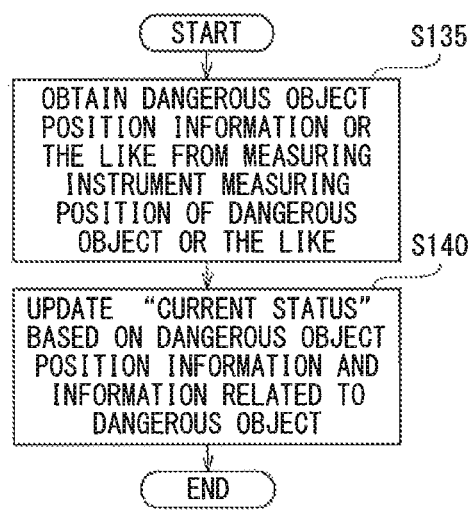
FIG. 34 is a diagram illustrating an example of a flowchart related to position information setting processing.

FIG. 34 is a diagram illustrating an example of a flowchart related to processing of setting the current position information of a dangerous object (position information setting processing) which is performed by a position information setting unit, which is an example of the function of the information processing apparatus 200.

In the beginning, the position information setting unit receives dangerous object determination information from a measuring instrument measuring the position of a dangerous object (or a dangerous object having a measuring instrument) (step 135). The dangerous object determination information includes current position information of a dangerous object (dangerous object position information) and information of a dangerous object ID. Note that it is also possible to employ a structure such that, instead of the dangerous object position information, orbit information or the like for calculating the dangerous object position information is received, and the position information setting unit calculates the dangerous object position information.

Next, the position information setting unit sets (updates) the "position information" based on the received dangerous object position information and information related to the dangerous object (step S140), and finishes the position information setting processing.

For example, in step S140, when the position information setting unit receives the dangerous object determination information including a dangerous object ID "010" and dangerous object position information "35.355187, 139.874618", the position information setting unit refers to the positionally fixed target table 210 and the mobile target table 220, and sets the dangerous object position information "35.355187, 139.874618" to the "current position" corresponding to the dangerous object ID "010".

Figure 35:
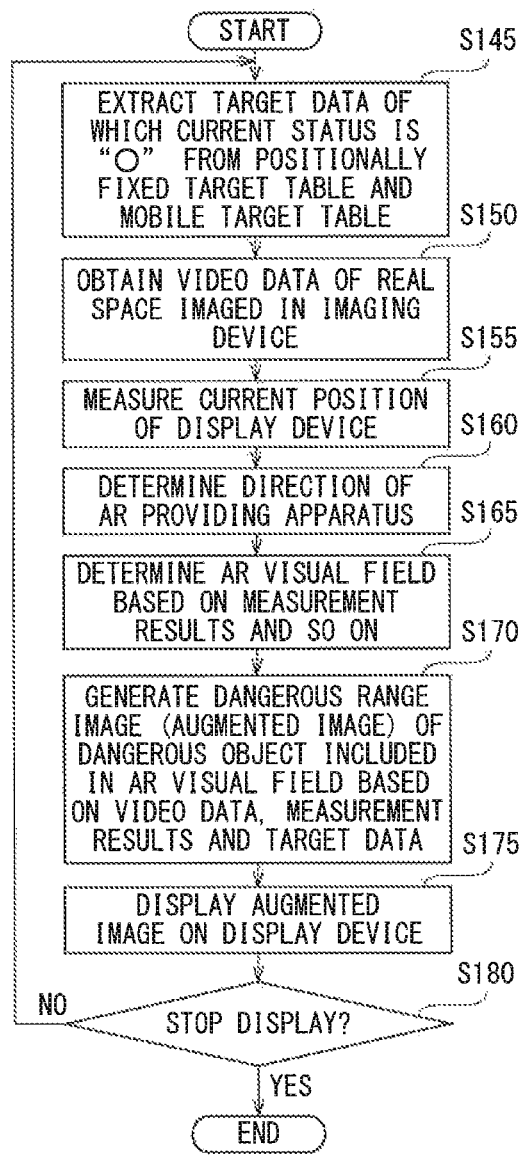
FIG. 35 is a diagram illustrating an example of a flowchart related to display processing.

FIG. 35 is a diagram illustrating an example of a flowchart related to display processing performed by respective functions in the AR providing apparatus 1000. It is assumed that the display processing is performed repeatedly when a mode for identifying the presence/absence of usage of the AR function (AR mode) is ON. Note that the user switches ON/OFF of the AR mode by pressing down a switch (not illustrated) for switching the AR mode.

First, in step S145, the retrieval unit 1055 retrieves (extracts) target data of which current status is "○" from the positionally fixed target table 210 and the mobile target table 220 from the information processing apparatus 200. Note that the target data extracted from the positionally fixed target table 210 includes information of dangerous object ID, reference position, and dangerous range of each state. Further, the target data extracted from the mobile target table 220 includes information of dangerous object ID, positioning reference, dangerous range of each state, and current position.

In this embodiment, as illustrated in FIG. 30 and FIG. 31, four pieces of data are read as the target data of which the current status is "○". For example, the target data determined by the state "2 (only east side is operating)" of the dangerous object ID "001" is read, and this target data include the dangerous object ID "001", reference position "35.354417, 139.867623", and dangerous range "radius 15 m, height 20 m, direction 0° to 180°" of each state.

Next, in step S150, the video obtaining unit 1070 obtains video data of a real space imaged in the imaging device 1035.

Next, in step S155, the measurement unit 1040 measures information (AR position information) indicating the current position of the AR providing apparatus 1000 from orbit information obtained from a satellite via the communication device 1015.

Next, in step S160, direction determination units (the direction information obtaining unit 1045 and the posture information obtaining unit 1050) determines the direction (direction and posture) of the AR providing apparatus 1000. That is, the direction information obtaining unit 1045 obtains direction information calculated in the direction detection device 1025, and the posture information obtaining unit 1050 obtains posture information calculated in the posture detection device 1030.

Next, in step S165, the visual field determination unit 1060 determines the AR visual field of the user wearing the display device 1020 based on measurement results (information obtained in step S150 and step S155) and so on.

Figure 36:
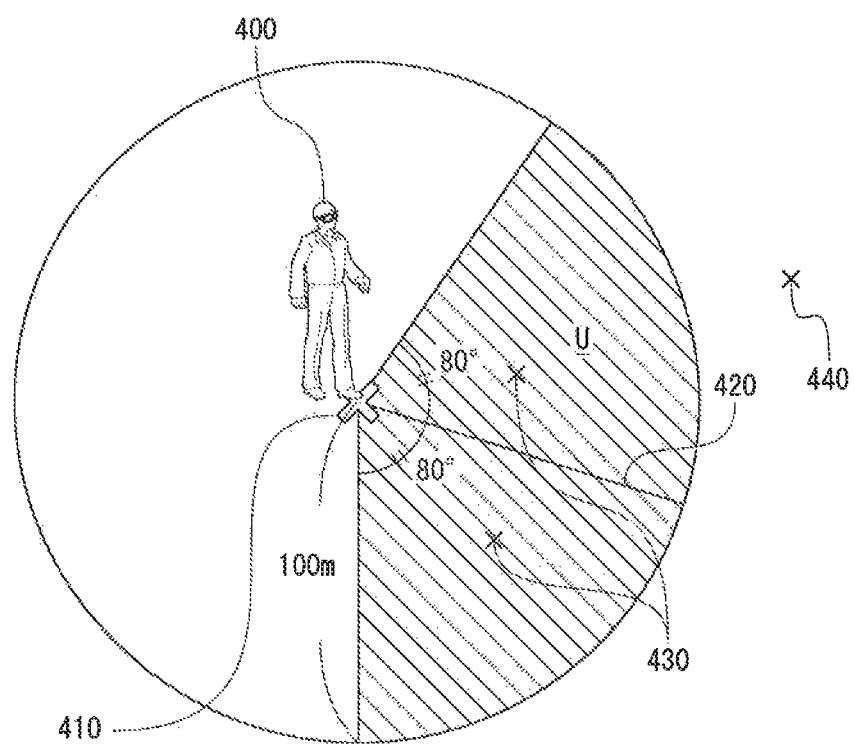
FIG. 36 is a diagram illustrating an example of an AR visual field.

Here, an example of an AR visual field U of a user 400 is illustrated in FIG. 36. In this embodiment, since the altitude of the dangerous object is set to "0", the AR visual field is determined in a planar form (or two dimensionally). However, when the altitude is added to the dangerous object position information, the AR visual field may be determined in a stereoscopic form (or three dimensionally).

Further, in this embodiment, as the visual field of the user 400, for example, information (visual field information) of the range of 160° in a leftward and rightward direction (and 120° in an upward and downward direction for example when the altitude is added) is set in advance and stored in the storage device 1010.

For example, the visual field determination unit 1060 determines as the AR visual field U a visual field in a predetermined range (having a radius of 100 m for example) centered on direction information 420 with reference to AR position information 410.

Next, in step S170, the display control unit 1065 generates a dangerous range image (augmented image) of a dangerous object included in the AR visual field based on the video data, the measurement results, and the target data.

More specifically, first, when the dangerous object position information included in the target data is included in the AR visual field, the display control unit 1065 determines that the dangerous object located at the dangerous object position information is a dangerous object included in the AR visual field. For example, in FIG. 36, dangerous object position information 430 is included in the AR visual field U, and hence the dangerous objects located at the dangerous object position information 430 are determined as included in the AR visual field U. Note that dangerous object position information 440 is not included in the AR visual field U, and thus the dangerous object located in the dangerous object position information 440 is determined as not included in the AR visual field U.

Then, the display control unit 1065 obtains a geometric transformation matrix based on the AR position information, the direction information, and the posture information.

At this moment, when the dangerous object is fixed, the display control unit 1065 calculates coordinates (range coordinates) corresponding to the dangerous range of each state corresponding to the determined dangerous object based on the coordinates of the dangerous object position information in a reference coordinate system, and applies the geometric transformation matrix to the calculated range coordinates to generate a dangerous range image (augmented image).

On the other hand, when the dangerous object moves, the display control unit 1065 analyzes the video data (image data constituting the video data) to determine the coordinates of a marker indicating a positioning reference added to the determined dangerous object in the reference coordinate system, calculates the range coordinates corresponding to the dangerous range of each state with the determined coordinates being the origin, and applies the geometric transformation matrix to the calculated range coordinates so as to generate the augmented image.

Note that the method for generating an augmented image is not limited to the above-described structure. For example, the display control, unit 1065 may calculate the point corresponding to the dangerous object position information and the point corresponding to the AR position information in a virtual coordinate system based on the video data, and may calculate a magnification from the distance between these points (relative distance) and the distance (absolute distance) between the dangerous object position information and the AR position information in the reference coordinate system, so as to generate the augmented image.

At this moment, when the dangerous object is fixed, the display control unit 1065 multiplies the dangerous range of each state corresponding to the determined dangerous object by the magnification, so as to generate the augmented image.

On the other hand, when the dangerous object moves, the display control unit 1065 analyzes the video data (image data constituting the video data) to determine the coordinates of the marker indicating a positioning reference added to the determined dangerous object in the reference coordinate system, applies the geometric transformation matrix to the determined coordinates to calculate coordinates (display coordinates) in the virtual coordinate system, and multiplies the dangerous range of each state corresponding to the determined dangerous object by the magnification with the calculated display coordinates being the origin, so as to generate the augmented image.

In step S175, the display control unit 1065 controls transmittance of the display device 1020 so that the augmented image is overlaid on the dangerous object in the real space (to make the dangerous object visually recognizable), and displays the augmented image.

In addition, when the display control unit 1065 determines plural dangerous objects included in the AR visual field, the display control unit generates and displays an augmented image for each of the plural dangerous objects. Note that the display control unit 1065 may overlay the generated augmented image on the video data and display overlaid images on the display device 1020.

Further, the method for displaying an augmented image is not limited to the above-described structure. For example, information (feature quantity or the like) for determining a dangerous object which is registered in advance may be obtained based on a dangerous object ID from the information processing apparatus 200, and the display control unit 1065 may perform recognition processing for video data using the feature quantity or the like to determine a dangerous object, and display a dangerous range image (augmented image) at the coordinates of the determined dangerous object. With this structure, the position for displaying the augmented image can be corrected to a position more suitable to the real space.

Figure 37A:
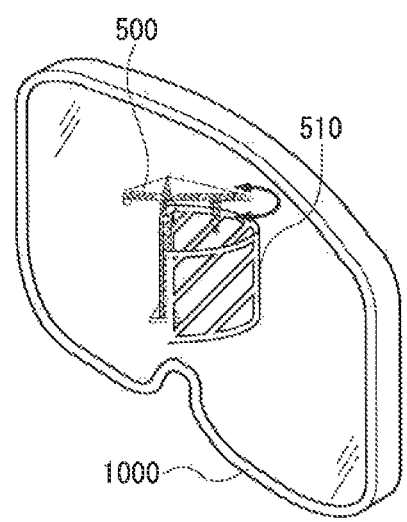
FIG. 37A is a diagram illustrating an example when a three-dimensional augmented image is displayed.
Figure 37B:
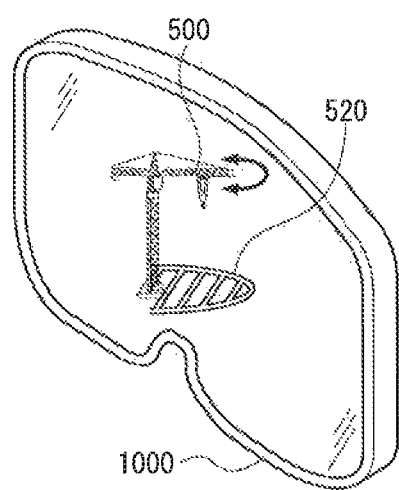
FIG. 37B is a diagram illustrating an example when a two-dimensional augmented image is displayed.

FIG. 37A illustrates an example when an augmented image 510 is overlaid and displayed on a crane (dangerous object ID "001", state "when only east side is operating") 500 as a display example of the case where a dangerous object is fixed. In this example, the height is set to "20 m" in the dangerous range of each state, and thus a stereoscopic (three-dimensional) augmented image 510 is displayed. Note that when the height is set to "0 m", a planar (two-dimensional) augmented image 520 is displayed. FIG. 37B illustrates an example when the two-dimensional augmented image 520 is displayed.

Figure 37C:
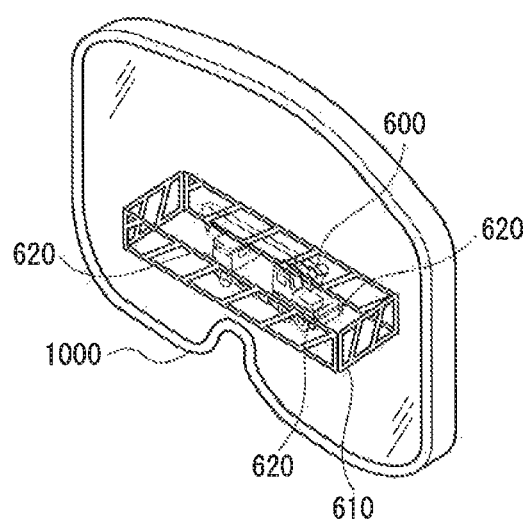
FIG. 37C is a diagram illustrating an example when an augmented image is displayed.

Further, FIG. 37C displays an example when an augmented image 610 is overlaid and displayed on a crane truck (dangerous object ID "011", state "moving") 600 to which a marker 620 indicating a positioning reference is added, as a display example of the case where the dangerous object moves.

In this embodiment, the structure to generate and display the dangerous range image has been described, but it is not limited to this. For example, a mode for identifying the presence/absence of usage of a safety display function (safety display mode) may be provided, and when the safety display mode is ON, the display control unit 1065 may display an image related to safety (evacuation route image or safety zone image) on the display device 1020 in addition to or instead of the dangerous range image.

Figure 37D:
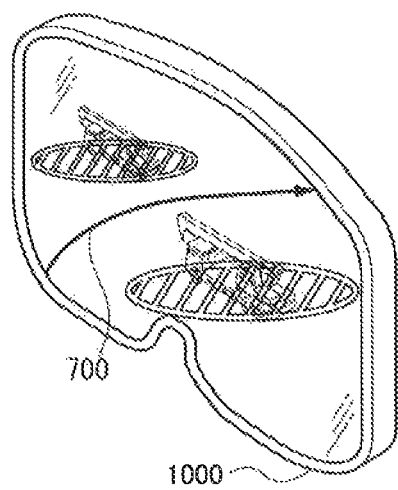
FIG. 37D is a diagram illustrating an example when an augmented image is displayed.

For example, the display control unit 1065 analyzes the dangerous range image to determine a part which is not the dangerous range image (a range which is not designated as the dangerous range) as a safety range, and generates an image (safety zone image) indicating the safety range. Further, for example, the display control unit 1065 calculates an evacuation route based on position information indicating the position of an exit of the factory which is set in advance and the AR position information, and generates an image (evacuation route image) indicating the calculated evacuation route. FIG. 37D illustrates an example when an image related to safety is displayed (evacuation route image 700).

Note that the user switches ON/OFF of the safety display mode by pressing down a switch (not illustrated) for switching the safety display mode.

In step S180, the display control unit 1065 determines whether to stop the display or not. At this moment, when the AR mode is ON, the display control unit 1065 determines not to stop the display, and subsequently, the processing of step S145 is performed. On the other hand, when the AR mode is OFF, the display control unit 1065 determines to stop the display, and the display processing is stopped.

Figure 38:
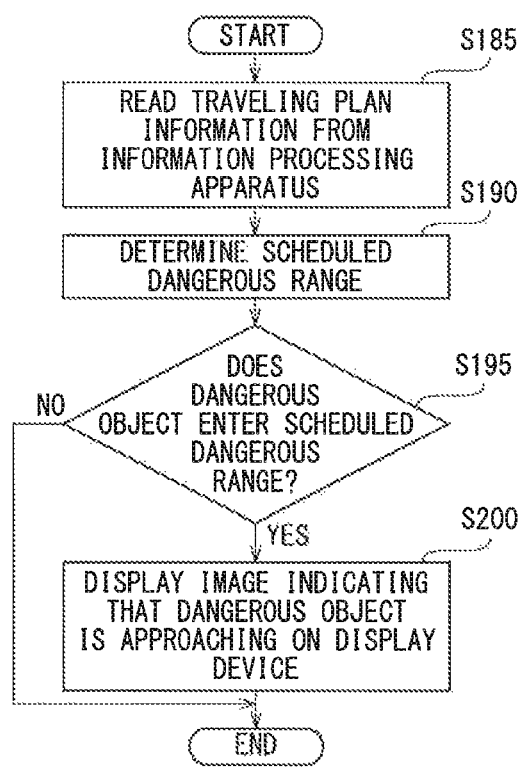
FIG. 38 is a diagram illustrating an example of a flowchart related to display processing.

FIG. 38 is a diagram illustrating an example of a flowchart related to display processing performed by respective functions in the AR providing apparatus 1000. This display processing is performed following the processing of step S175 or performed instead of the processing of step S170 and step S175.

First, the retrieval unit 1055 retrieves traveling plan information, which is an example of movement schedule information indicating a schedule of movement of a dangerous object, from the information processing apparatus 200 (step S185). The traveling plan information includes traveling position information indicating a position of traveling schedule of a dangerous object and traveling time information indicating a time thereof.

Next, in step S190, the display control unit 1065 determines a scheduled dangerous range. More specifically, the display control unit 1065 determines as the scheduled dangerous range a predetermined range (for example, the inside of a circle with a diameter of 50 m) with the dangerous object information being at its center.

Next, in step S195, the display control unit 1065 determines whether a dangerous object enters the scheduled dangerous range or not based on the obtained traveling plan information and the current time. More specifically, the display control unit 1065 obtains from the traveling plan information the traveling position information within a certain time (for example, within five minutes) from the current time, and determines whether the obtained traveling position information is included in the scheduled dangerous range or not. At this moment, when the display control unit 1065 determines that it is included (the dangerous object enters the scheduled dangerous range), processing of step S200 is performed subsequently. On the other hand, when the display control unit determines that it is not included (the dangerous object does not enter the scheduled dangerous range), the display processing is ended. Note that the display control unit 1065 determines that it is not included when the dangerous object position information is included in the AR visual field.

Figure 39:
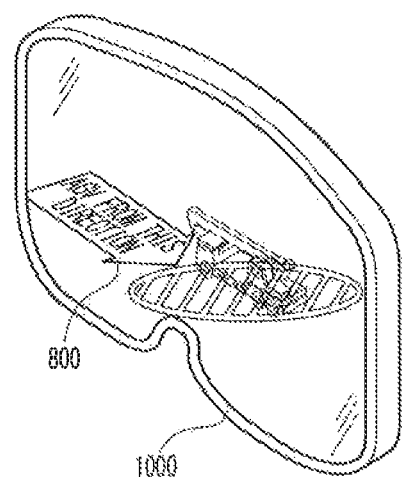
FIG. 39 is a diagram illustrating an example of display when a dangerous object is approaching.

In step S200, the display control unit 1065 displays on the display device 1020 an image indicating that the dangerous object is approaching. More specifically, the display control unit 1065 determines the direction in which the dangerous object is approaching from the obtained traveling schedule position and measurement results, and displays on the display device 1020 an image notifying that the dangerous object is approaching from the determined direction. FIG. 39 illustrates an example of display when a dangerous object (AGV: Automatic Guided Vehicle) is approaching from the left side of the user (warning display image 800).

Note that although the display control unit 1065 determines whether the dangerous object enters the scheduled dangerous range or not, it is not limited to this structure. For example, whether the dangerous object is approaching the AR providing apparatus 1000 or not may be determined based on the current time, the traveling plan information, and measurement results.

Embodiment 9

In Embodiment 8, the structure in which the AR providing apparatus 1000 has the imaging device 1035 is employed. An AR providing apparatus 1000 according to Embodiment 9 is characterized in that it does not have the imaging device 1035. Hereinafter, a main structure which is different from Embodiment 8 will be described.

Figure 40:
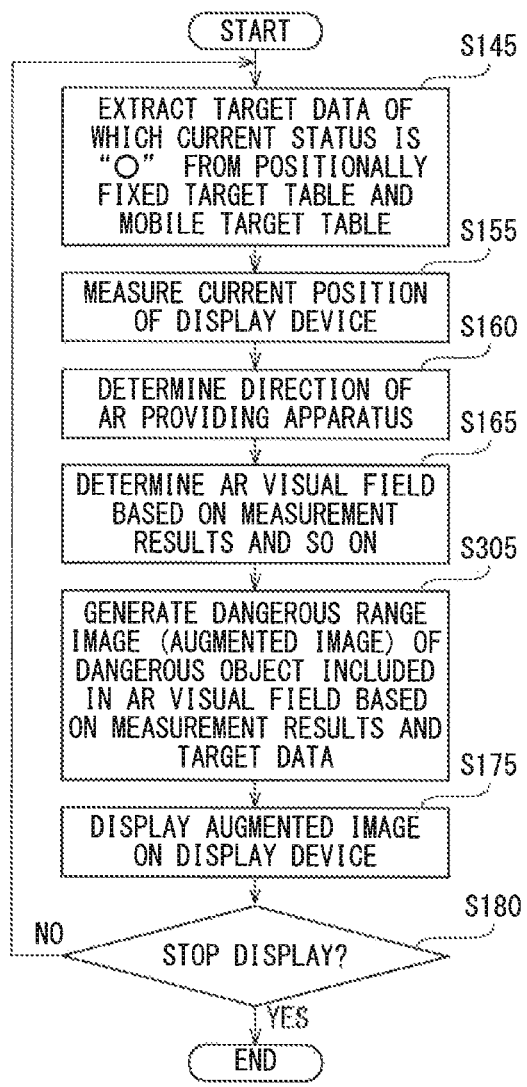
FIG. 40 is a diagram illustrating a flowchart related to display processing.

FIG. 40 is a diagram illustrating a flowchart related to display processing performed by respective functions in the AR providing apparatus 1000. The same reference numeral is added to the same processing as that illustrated in FIG. 35 of Embodiment 8, and the description thereof is omitted. Note that since the AR providing apparatus 1000 does not have the imaging device 1035, the processing of step S150 illustrated in FIG. 35 is not performed.

In step S305, the display control unit 1065 generates a dangerous range image (augmented image) of a dangerous object included in the AR visual field based on measurement results and target data.

More specifically, first, when the dangerous object position information included in target data is included in the AR visual field, the display control unit 1065 determines that the dangerous object located at the dangerous object position information is a dangerous object included in the AR visual field.

Then the display control unit 1065 obtains the geometric transformation matrix based on AR position information, direction information, and posture information.

Then the display control unit 1065 calculates the range coordinates corresponding to the dangerous range of each state corresponding to the determined dangerous object based on the coordinates of the dangerous object position information in the reference coordinate system, and applies the geometric transformation matrix to the calculated range coordinates so as to generate the augmented image. Note that although the method for generating a different augmented image depending on whether the dangerous object is fixed or not is employed in Embodiment 8, the augmented image is generated by the above-described method regardless of whether the dangerous object is fixed or not in Embodiment 9 since it is not possible to image a marker.

Other Embodiments

The above-described AR providing apparatus obtains information and so on related to a dangerous object so as to generate an augmented image from the information processing apparatus, but it is not limited to this. For example, the AR providing apparatus may store information for determining dangerous objects (feature quantities, image data of dangerous objects, and so on) in the storage device 1010, analyze video data imaged in the imaging device 1035 to determine a dangerous object included in the video data by recognition processing and, when it is determined that the determined dangerous object is in repetitive motion (rotational motion, reciprocal motion, or the like), generate a dangerous range image (augmented image) assuming the dangerous range due to the determined dangerous object.

Further, as the AR providing apparatus, various forms may be employed. For example, a portable terminal type AR providing apparatus may be employed. In this case, instead of the transmissive liquid crystal display, a non-transmissive liquid crystal display may be employed. Further, for example, a head-up display type AR providing apparatus may be employed in which an augmented image is combined and displayed with a target object in a real space which is projected optically transmissively.

Moreover, although functions are shared between the AR providing apparatus 1000 and the information processing apparatus 200 in the above-described embodiments, they may be performed in one apparatus, or an apparatus different from that described in the embodiments may have a similar function, such as generating an augmented image by the information processing apparatus 200 instead of the AR providing apparatus 1000.

Further, although a crane, a gas pipe, and a lathe are illustrated as the fixed dangerous object in the above-described embodiments, it is not limited to them. For example, a power-transmission line for transmitting electric power may be employed as the dangerous object. At this time, the operating state detection sensor detects that it is in operation (it is dangerous) when the voltage reaches a prescribed value (prescribed volts). Further, for example, piping for delivering fluid may be employed as the dangerous object. At this time, the operating state detection sensor detects that it is in operation when the temperature of the fluid reaches a prescribed value (prescribed temperature). Further, for example, a grinding machine (grinder) for finish-grinding the surface of a workpiece while rotating a grinding wheel may be employed as the dangerous object. At this time, the operating state detection sensor detects that it is in operation by detecting an operating status signal or operating schedule signal.

Further, in the above-described embodiments, when a dangerous object is recognized by the AR providing apparatus 1000, the structure is to generate and display an augmented image of the dangerous range of this dangerous object, but it is not always necessary to generate and display the augmented image of the dangerous range for all dangerous objects recognized by the AR providing apparatus 1000.

For example, when plural dangerous objects are captured in the visual field of the AR providing apparatus 1000, and if dangerous ranges are presented simultaneously for all the dangerous objects, it is possible that the user gets confused about where to pay attention. More specifically, it is not necessary to generate and present an augmented image of a dangerous range for a dangerous object which is located so far that it is not so dangerous yet for the user at the present moment. By presenting an augmented image even for such a dangerous object which is not so dangerous, it is rather possible that the user overlooks an augmented image for a dangerous object which is located close and really needs to be paid attention to.

Accordingly, it is possible to employ a structure to present an augmented image illustrating a dangerous range only for a dangerous object for which it is necessary at the present moment to display a dangerous range to the user. Describing more specifically, this structure is as follows.

In this structure, the AR providing apparatus 1000 generates an augmented image of the dangerous range of a dangerous object for the user only when, for example, the position of the user is located at a predetermined distance or closer (at a predetermined threshold or closer) from the dangerous object. FIG. 41 is a diagram illustrating an example of a table storing information related to dangerous objects (positionally fixed target table 910). Note that in the table illustrated in FIG. 41 additional items of display conditions are added compared to the table illustrated in FIG. 30.

In the structure using the positionally fixed target table 910, for example, since the display condition of the crane of the dangerous object ID "001" is to be within 30 m, the AR providing apparatus 1000 generates an augmented image and presents it to the user only when the distance to the crane of the dangerous object ID "001" is within 30 m. The other items are the same as those in the table illustrated in FIG. 30, and thus the descriptions thereof are omitted.

FIG. 42 is a diagram illustrating an example of a flowchart related to display processing. Note that in the flowchart illustrated in FIG. 42, step S405 for determining a distance between the AR providing apparatus 1000 and a dangerous object is added, compared to the flowchart illustrated in FIG. 35.

In step S405, when the display control unit 1065 determines a dangerous object included in the AR visual field, it obtains the distance to the dangerous object.

Regarding the distance between the AR providing apparatus 1000 and the dangerous object, it can be structured such that the display control unit 1065 calculates this distance based on the information indicating the current position of the AR providing apparatus 1000 (AR position information) and the reference position of the dangerous object indicated in FIG. 41. Alternatively, it may be structured such that a measurement unit is provided in the AR providing apparatus 1000, the measurement unit emits a laser to the target dangerous object, and the measurement unit measures the distance from the time the emitted laser is reflected at the dangerous object and returns to the measurement unit. Note that the steps other than step S405 are similar to those in the flowchart illustrated in FIG. 35, and thus the descriptions thereof are omitted.

Further, the display control unit 1065 reads the distance stored as a display condition from the positionally fixed target table 910, and compares it with the measurement result of the distance from the dangerous object. Then, when the measurement result of the distance from the dangerous object satisfies the display condition stored in the positionally fixed target table 910, the processing proceeds to step S170.

For example, in the case of the crane of the dangerous object ID "001", when it determines a crane included in the AR visual field, the display control unit 1065 obtains the distance to the crane. Further, the display control unit 1065 reads the display condition "within 30 m" corresponding to the crane of the dangerous object ID "001" from the positionally fixed target table 910. Then, the display control unit 1065 determines whether the obtained distance to the crane is "within 30 m" or not, which is the display condition. As a result of the determination, when it is within 30 m, the processing proceeds to step S170, the display control unit 1065 generates an augmented image representing a dangerous range for the dangerous object, and overlays and displays the image. On the other hand, when it is over 30 m, the processing returns to step S145.

Note that although an example in which items of display conditions are added to the positionally fixed target table illustrated in FIG. 30 is described in the above-described examples, it may be structured to add items of display conditions to the mobile target table illustrated in FIG. 31 and apply the flowchart illustrated in FIG. 42 to a moving dangerous object, and hence it is not limited in particular.

Further, although the structure in the above-described embodiments is to present information or the like related to a dangerous object to a worker, it may be a structure to provide information related to a dangerous object to a guard who patrols a work site instead of the worker, and hence it is not limited in particular.

With the structures of the above-described embodiments, a dangerous spot can be notified more appropriately when the dangerous spot changes temporally.

In the foregoing, the preferred embodiments of the present invention have been described in detail, but the present invention is not limited to such certain embodiments. Various changes and modifications are possible within the scope of the spirit of the present invention described in the claims.

Note that the above-described embodiments may be combined arbitrarily and implemented.

INDUSTRIAL APPLICABILITY

Aspects presented herein can be applied to a technology of AR displaying the operating status of a facility or the like for an observer in an installation or a factory. Further, the aspects can be applied to a technology of AR displaying a dangerous spot when the dangerous spot changes temporally.

The invention claimed is:

1. An information providing apparatus having a display unit and connected communicably to a storage unit, the information providing apparatus comprising:
   a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;
   a position information obtaining unit obtaining apparatus position information calculated from information indicating a position of the information providing apparatus which is detected in a position detection device;
   a direction information obtaining unit obtaining direction information calculated from information indicating a direction of the information providing apparatus which is detected in a direction detection device;
   a posture information obtaining unit obtaining posture information calculated from information indicating a posture of the information providing apparatus which is detected in a posture detection device;
   a determination unit determining a visual field of the information providing apparatus based on the apparatus position information obtained in the position information obtaining unit, the direction information obtained in the direction information obtaining unit, the posture information obtained in the posture information obtaining unit, and visual field information of the information providing apparatus which is defined in advance;
   a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit; and
   an input unit inputting a video imaged in an imaging device,
   wherein the display control unit calculates conversion information correlating a conversion between a coordinate system of a real space and a coordinate system of a display space by analyzing the video input by the input unit, calculates range coordinates corresponding to the dangerous range information based on coordinates of the dangerous target position information in the coordinate system of the real space, and applies the conversion information to the calculated range coordinates to generate the dangerous range image.

2. An information providing apparatus having a display unit and connected communicably to a storage unit, the information providing apparatus comprising:
   a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;
   a position information obtaining unit obtaining apparatus position information calculated from information indicating a position of the information providing apparatus which is detected in a position detection device;
   a direction information obtaining unit obtaining direction information calculated from information indicating a direction of the information providing apparatus which is detected in a direction detection device;
   a posture information obtaining unit obtaining posture information calculated from information indicating a posture of the information providing apparatus which is detected in a posture detection device;
   a determination unit determining a visual field of the information providing apparatus based on the apparatus position information obtained in the position information obtaining unit, the direction information obtained in the direction information obtaining unit, the posture information obtained in the posture information obtaining unit, and visual field information of the information providing apparatus which is defined in advance;
   a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit; and
   an input unit inputting a video imaged in an imaging device,
   wherein the display control unit calculates conversion information correlating a conversion between a coordinate system of a real space and a coordinate system of a display space by analyzing the video input by the input unit, determines coordinates of a marker indicating a reference position added to the determined dangerous target in the coordinate system of the real space, calculates range coordinates corresponding to the dangerous range information originating at the determined coordinates, and applies the conversion information to the calculated range coordinates to generate the dangerous range image.

3. The information providing apparatus according to claim 1, wherein
   the display control unit controls transmittance of the display unit to make the dangerous target visible via the display unit, and displays the dangerous range image.

4. The information providing apparatus according to claim 1, wherein
   the display control unit overlays and displays the dangerous range image on the video input by the input unit.

5. An information providing apparatus having a display unit and connected communicably to a storage unit, the information providing apparatus comprising:

a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining unit obtaining apparatus position information calculated from information indicating a position of the information providing apparatus which is detected in a position detection device;

a direction information obtaining unit obtaining direction information calculated from information indicating a direction of the information providing apparatus which is detected in a direction detection device;

a posture information obtaining unit obtaining posture information calculated from information indicating a posture of the information providing apparatus which is detected in a posture detection device;

a determination unit determining a visual field of the information providing apparatus based on the apparatus position information obtained in the position information obtaining unit, the direction information obtained in the direction information obtaining unit, the posture information obtained in the posture information obtaining unit, and visual field information of the information providing apparatus which is defined in advance; and a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit, wherein the reading unit further reads movement schedule information indicating a schedule of the dangerous target to move, which is stored in the storage unit, and when the display control unit determines that the dangerous target does not exist in the visual field, if the display control unit determines that the dangerous target is approaching the information providing apparatus based on the movement schedule information read in the reading unit, and the apparatus position information and a current time, the display control unit generates an image notifying of a danger due to the dangerous target and displays the image on the display unit.

6. An information providing apparatus having a display unit and connected communicably to a storage unit, the information providing apparatus comprising:

a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining unit obtaining apparatus position information calculated from information indicating a position of the information providing apparatus which is detected in a position detection device;

a direction information obtaining unit obtaining direction information calculated from information indicating a direction of the information providing apparatus which is detected in a direction detection device;

a posture information obtaining unit obtaining posture information calculated from information indicating a posture of the information providing apparatus which is detected in a posture detection device;

a determination unit determining a visual field of the information providing apparatus based on the apparatus position information obtained in the position information obtaining unit, the direction information obtained in the direction information obtaining unit, the posture information obtained in the posture information obtaining unit, and visual field information of the information providing apparatus which is defined in advance; and a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit, wherein the display control unit generates the dangerous range image and displays the image on the display unit when a distance to the dangerous target is equal to or less than a predetermined threshold.

7. The information providing apparatus according to claim 1, wherein when the display control unit generates dangerous range images for plural dangerous targets, the display control unit generates a dangerous range image for each of the plural dangerous targets, and analyzes generated plural dangerous range images to determine a safety zone or an evacuation route where dangers due to the plural dangerous targets do not reach, and further generates an image indicating the determined safety zone or evacuation route and displays the image on the display unit.

8. The information providing apparatus according to claim 1, wherein the display control unit generates the dangerous range image in at least one selected from a group consisting of a planar form and a stereoscopic form.

9. An information providing method executed by an information providing apparatus having a display unit and connected communicably to a storage unit, the information providing method comprising:

a reading step of reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining step of obtaining apparatus position information calculated from information indicating a position of the information providing apparatus which is detected in a position detection device;

a direction information obtaining step of obtaining direction information calculated from information indicating a direction of the information providing apparatus which is detected in a direction detection device;

a posture information obtaining step of obtaining posture information calculated from information indicating a posture of the information providing apparatus which is detected in a posture detection device;

a determination step of determining a visual field of the information providing apparatus based on the apparatus position information obtained in the position information obtaining step, the direction information obtained in the direction information obtaining step, the posture information obtained in the posture information obtaining step, and visual field information of the information providing apparatus which is defined in advance;

a display control step of determining a dangerous target included in the visual field based on the apparatus position information, the direction information, the posture information, and the dangerous range information and the dangerous target position information which are read in the reading step, and generating a dangerous range image for the determined dangerous target and displaying the image on the display unit; and an input step of inputting a video imaged in an imaging device, wherein, in the display control step, conversion information correlating a conversion between a coordinate system of a real space and a coordinate system of a display space is calculated by analyzing the video input in the input step, range coordinates corresponding to the dangerous range information is calculated based on coordinates of the dangerous target position information in the coordinate system of the real space, and the conversion information is applied to the calculated range coordinates to generate the dangerous range image.

10. An information providing method executed by an information providing apparatus having a display unit and connected communicably to a storage unit, the information providing method comprising:

a reading step of reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining step of obtaining apparatus position information calculated from information indicating a position of the information providing apparatus which is detected in a position detection device;

a direction information obtaining step of obtaining direction information calculated from information indicating a direction of the information providing apparatus which is detected in a direction detection device;

a posture information obtaining step of obtaining posture information calculated from information indicating a posture of the information providing apparatus which is detected in a posture detection device;

a determination step of determining a visual field of the information providing apparatus based on the apparatus position information obtained in the position information obtaining step, the direction information obtained in the direction information obtaining step, the posture information obtained in the posture information obtaining step, and visual field information of the information providing apparatus which is defined in advance;

a display control step of determining a dangerous target included in the visual field based on the apparatus position information, the direction information, the posture information, and the dangerous range information and the dangerous target position information which are read in the reading step, and generating a dangerous range image for the determined dangerous target and displaying the image on the display unit; and an input step of inputting a video imaged in an imaging device, wherein, in the display control step, conversion information correlating a conversion between a coordinate system of a real space and a coordinate system of a display space is calculated by analyzing the video input by the input unit, coordinates of a marker indicating a reference position added to the determined dangerous target in the coordinate system of the real space is determined, range coordinates corresponding to the dangerous range information originating at the determined coordinates is calculated, and the conversion information is applied to the calculated range coordinates to generate the dangerous range image.

11. An information providing method executed by an information providing apparatus having a display unit and connected communicably to a storage unit, the information providing method comprising:

a reading step of reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining step of obtaining apparatus position information calculated from information indicating a position of the information providing apparatus which is detected in a position detection device;

a direction information obtaining step of obtaining direction information calculated from information indicating a direction of the information providing apparatus which is detected in a direction detection device;

a posture information obtaining step of obtaining posture information calculated from information indicating a posture of the information providing apparatus which is detected in a posture detection device;

a determination step of determining a visual field of the information providing apparatus based on the apparatus position information obtained in the position information obtaining step, the direction information obtained in the direction information obtaining step, the posture information obtained in the posture information obtaining step, and visual field information of the information providing apparatus which is defined in advance; and a display control step of determining a dangerous target included in the visual field based on the apparatus position information, the direction information, the posture information, and the dangerous range information and the dangerous target position information which are read in the reading step, and generating a dangerous range image for the determined dangerous target and displaying the image on the display unit, wherein, in the reading step, movement schedule information indicating a schedule of the dangerous target to move, which is stored in the storage unit, is further read, and in the display control step, when it is determined that the dangerous target does not exist in the visual field, if it is determined that the dangerous target is approaching the information providing apparatus based on the movement schedule information read in the reading step, and the apparatus position information and a current time, an image notifying of a danger due to the dangerous target is generated and displayed on the display unit.

12. An information providing method executed by an information providing apparatus having a display unit and connected communicably to a storage unit, the information providing method comprising:

a reading step of reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining step of obtaining apparatus position information calculated from information indicating a position of the information providing apparatus which is detected in a position detection device;

a direction information obtaining step of obtaining direction information calculated from information indicating a direction of the information providing apparatus which is detected in a direction detection device;

a posture information obtaining step of obtaining posture information calculated from information indicating a posture of the information providing apparatus which is detected in a posture detection device;

a determination step of determining a visual field of the information providing apparatus based on the apparatus position information obtained in the position information obtaining step, the direction information obtained in the direction information obtaining step, the posture information obtained in the posture information obtaining step, and visual field information of the information providing apparatus which is defined in advance; and a display control step of determining a dangerous target included in the visual field based on the apparatus position information, the direction information, the posture information, and the dangerous range information and the dangerous target position information which are read in the reading step, and generating a dangerous range image for the determined dangerous target and displaying the image on the display unit, wherein, in the display control step, the dangerous range image is generated and displayed on the display unit when a distance to the dangerous target is equal to or less than a predetermined threshold.

13. A program causing a computer having a display unit and connected communicably to a storage unit to function as:

a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining unit obtaining apparatus position information calculated from information indicating a position of the computer which is detected in a position detection device;

a direction information obtaining unit obtaining direction information calculated from information indicating a direction of the computer which is detected in a direction detection device;

a posture information obtaining unit obtaining posture information calculated from information indicating a posture of the computer which is detected in a posture detection device;

a determination unit determining a visual field of the computer based on the apparatus position information obtained in the position information obtaining unit, the direction information obtained in the direction information obtaining unit, the posture information obtained in the posture information obtaining unit, and visual field information of the computer which is defined in advance;

a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit; and an input unit inputting a video imaged in an imaging device, wherein the display control unit calculates conversion information correlating a conversion between a coordinate system of a real space and a coordinate system of a display space by analyzing the video input by the input unit, calculates range coordinates corresponding to the dangerous range information based on coordinates of the dangerous target position information in the coordinate system of the real space, and applies the conversion information to the calculated range coordinates to generate the dangerous range image.

14. A program causing a computer having a display unit and connected communicably to a storage unit to function as:

a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;

a position information obtaining unit obtaining apparatus position information calculated from information indicating a position of the computer which is detected in a position detection device;

a direction information obtaining unit obtaining direction information calculated from information indicating a direction of the computer which is detected in a direction detection device;

a posture information obtaining unit obtaining posture information calculated from information indicating a posture of the computer which is detected in a posture detection device;

a determination unit determining a visual field of the computer based on the apparatus position information obtained in the position information obtaining unit, the direction information obtained in the direction information obtaining unit, the posture information obtained in the posture information obtaining unit, and visual field information of the computer which is defined in advance;

a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit; and an input unit inputting a video imaged in an imaging device, wherein the display control unit calculates conversion information correlating a conversion between a coordinate system of a real space and a coordinate system of a display space by analyzing the video input by the input unit, determines coordinates of a marker indicating a reference position added to the determined dangerous target in the coordinate system of the real space, calculates range coordinates corresponding to the dangerous range information originating at the determined coordinates, and applies the conversion information to the calculated range coordinates to generate the dangerous range image.

15. A program causing a computer having a display unit and connected communicably to a storage unit to function as:
- a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;
- a position information obtaining unit obtaining apparatus position information calculated from information indicating a position of the computer which is detected in a position detection device;
- a direction information obtaining unit obtaining direction information calculated from information indicating a direction of the computer which is detected in a direction detection device;
- a posture information obtaining unit obtaining posture information calculated from information indicating a posture of the computer which is detected in a posture detection device;
- a determination unit determining a visual field of the computer based on the apparatus position information obtained in the position information obtaining unit, the direction information obtained in the direction information obtaining unit, the posture information obtained in the posture information obtaining unit, and visual field information of the computer which is defined in advance; and
- a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit, wherein the reading unit further reads movement schedule information indicating a schedule of the dangerous target to move, which is stored in the storage unit, and
- when the display control unit determines that the dangerous target does not exist in the visual field, if the display control unit determines that the dangerous target is approaching the information providing apparatus based on the movement schedule information read in the reading unit, and the apparatus position information and a current time, the display control unit generates an image notifying a danger due to the dangerous target and displays the image on the display unit.

16. A program causing a computer having a display unit and connected communicably to a storage unit to function as:
- a reading unit reading dangerous range information indicating a dangerous range of each state of a dangerous target having a changing operating state, wherein the dangerous range changes depending on the operating state of the dangerous target, and dangerous target position information indicating a position of the dangerous target, which are stored in the storage unit;
- a position information obtaining unit obtaining apparatus position information calculated from information indicating a position of the computer which is detected in a position detection device;
- a direction information obtaining unit obtaining direction information calculated from information indicating a direction of the computer which is detected in a direction detection device;
- a posture information obtaining unit obtaining posture information calculated from information indicating a posture of the computer which is detected in a posture detection device;
- a determination unit determining a visual field of the computer based on the apparatus position information obtained in the position information obtaining unit, the direction information obtained in the direction information obtaining unit, the posture information obtained in the posture information obtaining unit, and visual field information of the computer which is defined in advance; and
- a display control unit determining a dangerous target included in the visual field based on the apparatus position information, the direction information, the posture information, and the dangerous range information and the dangerous target position information which are read in the reading unit, and generating a dangerous range image for the determined dangerous target and displaying the image on the display unit, wherein the display control unit generates the dangerous range image and displays the image on the display unit when a distance to the dangerous target is equal to or less than a predetermined threshold.

17. The information providing apparatus according to claim 1, wherein the dangerous range and the dangerous target position information are previously set and stored in the storage unit.

* * * * *